(12) United States Patent
Schickel et al.

(10) Patent No.: US 11,652,970 B2
(45) Date of Patent: May 16, 2023

(54) APPARATUS AND METHOD FOR REPRESENTING A SPATIAL IMAGE OF AN OBJECT IN A VIRTUAL ENVIRONMENT

(71) Applicant: Bitmanagement Software GmbH, Berg (DE)

(72) Inventors: Peter Schickel, Berg (DE); Ulrich Seng, Starnberg (DE)

(73) Assignee: BITMANAGEMENT SOFTWARE GMBH, Berg (DE)

( * ) Notice: Subject to any disclaimer, the term of this patent is extended or adjusted under 35 U.S.C. 154(b) by 306 days.

(21) Appl. No.: 16/561,341

(22) Filed: Sep. 5, 2019

(65) Prior Publication Data

US 2019/0394443 A1    Dec. 26, 2019

Related U.S. Application Data

(63) Continuation of application No. PCT/EP2018/055518, filed on Mar. 6, 2018.

(30) Foreign Application Priority Data

Mar. 7, 2017 (DE) ..................... 10 2017 203 721.0

(51) Int. Cl.
*H04N 13/128* (2018.01)
*H04N 13/111* (2018.01)
(Continued)

(52) U.S. Cl.
CPC ............. *H04N 13/111* (2018.05); *G06T 7/70* (2017.01); *H04N 5/272* (2013.01);
(Continued)

(58) Field of Classification Search
CPC .. H04N 13/111; H04N 13/243; H04N 13/128; H04N 13/239; H04N 13/122;
(Continued)

(56) References Cited

U.S. PATENT DOCUMENTS 6,078,329 A * 6/2000 Umeki .................... G06T 13/40
                                                           345/419
10,008,027 B1 * 6/2018 Baker ....................... G06T 7/13
(Continued)

FOREIGN PATENT DOCUMENTS

DE        102007028654 A1 * 1/2009 ......... H04N 13/0022

OTHER PUBLICATIONS

Written Report dated Nov. 21, 2019, issued in application No. PCT/EP2018/055518.
(Continued)

*Primary Examiner* — Shawn S An
(74) *Attorney, Agent, or Firm* — McClure, Qualey & Rodack, LLP

(57) ABSTRACT

Shown is an apparatus for representing a spatial image of an object in a virtual environment. The apparatus includes a first image capturing element configured to generate a first stereoscopic image data stream of an environment. A second image capturing element may generate a second stereoscopic image data stream of the object. A computing unit is configured to receive the first and the second stereoscopic image data streams, proceeding from a reference point, to generate a spatial image of the virtual environment based on the first stereoscopic image data stream and to insert, proceeding from the reference point, the object from the second stereoscopic image data stream into the virtual environment. A display element may, proceeding from the reference point, display the spatial image of the object in the virtual environment so that a viewer of the display element is given the impression of a 3D object in a 3D environment.

14 Claims, 9 Drawing Sheets

(51) Int. Cl.
*G06T 7/70* (2017.01)
*H04N 13/239* (2018.01)
*H04N 13/122* (2018.01)
*H04N 13/243* (2018.01)
*H04N 5/272* (2006.01)

(52) U.S. Cl.
CPC ......... *H04N 13/122* (2018.05); *H04N 13/128* (2018.05); *H04N 13/239* (2018.05); *H04N 13/243* (2018.05); *G06T 2207/10021* (2013.01); *G06T 2207/30201* (2013.01)

(58) Field of Classification Search
CPC ............. G06T 7/70; G06T 2207/10021; G06T 2207/30201
See application file for complete search history.

(56) References Cited

U.S. PATENT DOCUMENTS

| | | | | |
|---|---|---|---|---|
| 2003/0085908 | A1* | 5/2003 | Luby | G06T 7/70 345/619 |
| 2007/0110298 | A1* | 5/2007 | Graepel | G06T 15/00 345/619 |
| 2007/0210985 | A1* | 9/2007 | Royer | G03B 35/18 345/46 |
| 2009/0079847 | A1* | 3/2009 | Ohtsuka | H04N 5/23206 348/231.2 |
| 2010/0309288 | A1* | 12/2010 | Stettner | H04N 5/33 348/E13.001 |
| 2010/0321388 | A1* | 12/2010 | Daly | H04N 13/315 345/672 |
| 2012/0072939 | A1* | 3/2012 | Crenshaw | H04N 21/44218 725/12 |
| 2012/0130717 | A1 | 5/2012 | Xu et al. | |
| 2012/0293693 | A1* | 11/2012 | Sumitomo | H04N 13/221 348/246 |
| 2013/0278631 | A1* | 10/2013 | Border | G02C 5/143 345/633 |
| 2014/0035904 | A1* | 2/2014 | Ge | H04N 9/3194 345/419 |
| 2014/0347444 | A1* | 11/2014 | Naske | H04N 13/271 348/46 |
| 2017/0061200 | A1* | 3/2017 | Wexler | G06T 7/11 |
| 2017/0154214 | A1* | 6/2017 | Freeman | G06V 40/28 |
| 2017/0251911 | A1* | 9/2017 | Ito | A61B 1/000095 |
| 2018/0027225 | A1* | 1/2018 | Masumura | H04N 13/398 348/59 |
| 2018/0131907 | A1* | 5/2018 | Schmirler | H04N 5/23238 |
| 2018/0189607 | A1* | 7/2018 | Cocias | G06K 9/6256 |
| 2018/0249151 | A1* | 8/2018 | Freeman | A61B 3/0025 |

OTHER PUBLICATIONS

International Search Report Nov. 21, 2019, issued in application No. PCT/EP2018/055518.
Translation of International Search Report.
Orts-Escolano, S., et al.; "Holoportation: Virtual 3D Teleportation in Real-Time;" User Interface Software and Techology; Oct. 2016; pp. 741-754.

* cited by examiner

APPARATUS AND METHOD FOR REPRESENTING A SPATIAL IMAGE OF AN OBJECT IN A VIRTUAL ENVIRONMENT

CROSS-REFERENCES TO RELATED APPLICATIONS

This application is a continuation of copending International Application No. PCT/EP2018/055518, filed Mar. 6, 2018, which is incorporated herein by reference in its entirety, and additionally claims priority from German Application No. DE 10 2017 203 721.0, filed Mar. 7, 2017, which is incorporated herein by reference in its entirety.

BACKGROUND OF THE INVENTION

The present invention refers to the field of generating spatial images, i.e. images that give a user a three-dimensional impression of a virtual environment, wherein the virtual environment may also comprise spatial images (i.e. stereoscopic images). Embodiments show a virtual conference room in which one or several persons are represented based on a current video of the person in real time, without the person(s) recognizing any significant delay of their own movement with respect to the movement of the spatial image in the virtual space. Thus, the users may be given a complete three-dimensional impression of the people that are located in the same conference room, as well as of the conference room itself. In addition, the conference room and the people may be generated based on real video recordings and not by means of computer-animated representations.

Known systems that visualize the communication in chat rooms, for example, use avatars to represent people, i.e. artificial representations that have no or very little relation to the person that is portrayed. Currently, at least the environment, the people represented or both are computer-generated in a fully stereoscopic representation. At best, a real image is reproduced, e.g. using polygons. However, the result is a computer-generated virtual representation that cannot leave a realistic impression on users.

SUMMARY

According to an embodiment, an apparatus for representing a spatial image of an object in a virtual environment may have: a first image capturing element configured to generate a first stereoscopic image data stream of an environment; a second image capturing element configured to generate a second stereoscopic image data stream of the object; a computing unit configured to receive the first and the second stereoscopic image data streams, proceeding from a reference point, to generate a spatial image of the virtual environment based on the first stereoscopic image data stream and, proceeding from the reference point, to insert a spatial image of the object from the second stereoscopic image data stream into the virtual environment; and a display element configured to, proceeding from the reference point, display the spatial image of the object in the virtual environment.

According to another embodiment, a method for presenting a spatial image of an object in a virtual environment may have the steps of: generating a first stereoscopic image data stream of an environment; generating a second stereoscopic image data stream of the object; receiving the first and the second stereoscopic image data streams; generating a spatial image of the virtual environment, proceeding from a reference point, based on the first stereoscopic image data stream; inserting the object, proceeding from the reference point, from the second stereoscopic image data stream into the virtual environment; and displaying, proceeding from the reference point, the spatial image of the object in the virtual environment.

Another embodiment may have a non-transitory digital storage medium having a computer program stored thereon to perform the method for presenting a spatial image of an object in a virtual environment, having the steps of: generating a first stereoscopic image data stream of an environment; generating a second stereoscopic image data stream of the object; receiving the first and the second stereoscopic image data streams; generating a spatial image of the virtual environment, proceeding from a reference point, based on the first stereoscopic image data stream; inserting the object, proceeding from the reference point, from the second stereoscopic image data stream into the virtual environment; and displaying, proceeding from the reference point, the spatial image of the object in the virtual environment, when said computer program is run by a computer.

Another embodiment may have an image capturing element configured to record a spatial image of an object and/or a spatial image of an environment.

Embodiments show an apparatus for representing a spatial image of an object in a virtual environment. The apparatus comprises a first image capturing element configured to generate a first stereoscopic image data stream of an environment. A second image capturing element may generate a second stereoscopic image data stream of the object. Furthermore, a computing unit is configured to receive the first and the second stereoscopic image data streams, proceeding from a reference point, to generate a spatial image of the virtual environment based on the first stereoscopic image data stream, and, proceeding from the reference point, to insert the object from the second stereoscopic image data stream into the virtual environment. A display element may, proceeding from the reference point, display the spatial image of the object in the virtual environment such that a viewer of the display element is given the impression of a 3D object in a 3D environment.

The present disclosure is based on the idea to maximize the user experience, i.e. the impression of a virtual space, by representing both the environment and the objects represented therein both in a stereoscopic manner and also with the original video recording of this scene. Thus, a user may immerse himself/herself in a video world (and not in a computer-animated world as previously the case) of the virtual space, e.g., via video glasses or another suitable display, thereby improving the closeness to reality of the surfaces. Furthermore, the depth information of the environment as well as of the objects represented therein is preserved by means of the stereoscopic representation of the videos, and the user is therefore given the spatial representation in a realistic manner. By means of the combination of the surface representation and the spatial representation, the user is therefore given the impression that he/she is actually standing in the recorded real environment.

Embodiments show the apparatus having a third image capturing element configured to generate a third stereoscopic image data stream of a further object. The computing unit may receive the third stereoscopic image data stream and determine an orientation of the further object in the third stereoscopic image data stream. Optionally, the computing unit may further, proceeding from the reference point, adjust disparities of the spatial image of the virtual environment as well as disparities of the spatial image of the object based on the orientation of the further object. In general, the computing unit is configured to insert the object from the third stereoscopic image data stream as a spatial image into the virtual environment. In order to adapt the depth information of the spatial image (or to adapt the position of the at least two image data streams of the stereoscopic image data stream), the disparities, or a depth map, may further be generated, or adjusted, proceeding from the reference point. Now, the display element may, taking into account the determined/adjusted disparities, or based on the depth map of the spatial image and the virtual environment, display the spatial image of the object in the virtual environment, i.e. in the spatial image of the virtual environment. Furthermore, the terms disparity and depth map may further be used interchangeably.

Embodiments show the apparatus, wherein the computing unit is configured to insert a spatial image of the further object into the virtual environment from the third stereoscopic image data stream and to adjust disparities of the spatial image of the further object based on an orientation of the object. The disparities may be adjusted proceeding from a further reference point. A further display element may, taking into account the disparities of the spatial image and the virtual environment, display the spatial image of the further object in the virtual environment such that a viewer of the further display element is given the impression of a 3D object in a 3D environment. Thus, the spatial image of the object from the second stereoscopic image data stream may be displayed to the viewer of the further display element, whereas the spatial image of the further object may be displayed to the viewer of the display element.

Embodiments show the computing unit that, upon a change of the reference point and/or the further reference point, re-generates the spatial image of the virtual environment and the spatial image of the object based on the changed reference point. This may lead to the disparities being newly computed based on the changed (further) reference point. Then, the display element may represent the newly computed images.

Furthermore, embodiments show the apparatus, wherein the first image capturing element is configured to generate the first stereoscopic image data stream in an initialization phase. The computing unit may receive the first stereoscopic data stream, store the same in a memory and, in an operating mode, generate a spatial image of the environment from the stored first stereoscopic data stream depending on the reference point. In other words, it is possible to once generate a recording of the environment that is used in the virtual space as a virtual environment since the same is typically not changed, or remains constant over a period of time. Thus, the first stereoscopic image data stream may be generated (once) in an initialization phase and then be stored locally on a memory. The first stereoscopic image data stream may comprise information, i.e. recordings, of at least one, optionally of a plurality, of different positions in the space. The reference points may be located on these positions in the virtual environment. If the reference points are located outside of these positions, the representation may be estimated, e.g. interpolated.

However, the virtual environment may also be adjusted, or updated, during the specified period. For this, a stereo camera or a plurality of stereo cameras may be arranged in the real environment in order to re-record the first stereoscopic image data stream at regular intervals. For this, omnidirectional, or 360°, stereo cameras may be used so that the first stereoscopic image data stream may also be recorded, or updated, in real time. This may be useful if external influences such as changing light conditions or moving objects such as trees, animals or people are to be represented in the virtual environment.

Embodiments further show the apparatus, wherein the second image capturing element is configured to generate the second stereoscopic image data stream of the object at further points in time. The computing unit may receive the second stereoscopic image data stream at a further point in time, determine, proceeding from a reference point, a position and/or an orientation of the object at the further point in time, and adapt the spatial image of the object in the virtual environment based on the position and/or the orientation of the object at the further point in time. In other words, the computing unit, e.g. a 3D engine, may adapt the spatial image both of the object and also of the virtual environment dynamically and optionally in real time. The reference point may also be adjusted dynamically. The computing unit may then re-determine and readjust the disparities based on the new reference point and an orientation of the same. In general, for generating the spatial images or determining/adapting the disparities, one may assume a person standing on the reference point. Furthermore, this person may look into a certain direction, characterizing the orientation of the reference point. The computing unit may compute the position and/or the orientation from the third image data stream, e.g., by determining the position and/or the orientation of the further object from the third image data stream with respect to a (stereo) camera that is recording. In order to be able to arbitrarily change the reference point in the space, it is further advantageous to record, in addition to the stereoscopic illustration giving a spatial depth, a 3D view of the objects to further enable an omnidirectional view around the object and to therefore record the same from each side.

Embodiments further show the computing unit that may superimpose at least one part of the spatial image of the object with superimposition image data. Thus, the object and/or the further object, if they are people, may be superimposed with a face or an eye area of another, e.g. famous, person. If the person wears data glasses when generating the image data stream, it is further possible to replace, or superimpose, the data glasses in the spatial image in the virtual environment with a recording of the eye area, or the face, of the person without data glasses, wherein the recording may be stored in a memory, for example. However, the superimposition image data may additionally also be recorded stereoscopically such that the overall impression of the user still remains realistic by means of the superimposition image data. In general, the description as to the object may also be applied to the further object. Only the reference points and the corresponding image capturing elements, or display elements, are to be adapted accordingly.

In embodiments, the computing unit may determine a current appearance of the object and adapt the superimposition image data based on the determined current appearance or select superimposition image data from a plurality of superimposition image data based on the determined current appearance, and to superimpose the selected superimposition image data onto the part of the spatial image. Furthermore, in the initialization phase, the (second or third) image capturing element may record an eye area or a face of a person as the object and store the same as superimposition image data. For example, in the operating mode, the computing unit may superimpose data glasses worn by the person with the superimposition images obtained in the initialization phase. Furthermore, the computing unit may adapt the eye area of the face in the superimposition image data based on a mood (here the appearance) of the person and superimpose the adapted superimposition image data of the person.

In other words, e.g., in the superimposition of the data glasses with the facial area and/or eye area from the superimposition image data, prominent points in the superimposition image data in the face such as the eyes or the mouth may be adapted to a mood of the person. For example, the corners of the mouth pointing upwards may be used to conclude that the person is laughing so that the inserted eye area represents laughing eyes, i.e. slightly pinched eyes, for example. This modification is applied to static superimposition image data, e.g. by means of an image processing algorithm, so that the static superimposition image data appears to be dynamic. Further embodiments show that a plurality of superimposition image data may be stored, e.g., wherein an appropriate eye area to be superimposed or an appropriate face may be acquired by means of a comparison of the current recording of the mouth with respect to a mouth from the stored superimposition image data. In other words, the imaging unit may create a plurality of superimposition image data, the computing unit being configured to compare the mood based on a comparison of a current position of the corners of the mouth of the person with respect to a position of the corners of the mouth in the plurality of superimposition image data and to select the superimposition image that best reflects the current facial expression.

A method may represent the processes performed by the apparatus. The method may be represented by a program code which, when executed on a computer, performs the corresponding method steps.

BRIEF DESCRIPTION OF THE DRAWINGS

Embodiments of the present invention will be detailed subsequently referring to the appended drawings, in which:

FIG. 3(A) schematically shows the approach for removing the background from a scene according to an embodiment, wherein FIG. 3(A) shows the initially recorded scene.

FIG. 3(B) schematically shows the approach for removing the background from a scene according to an embodiment, wherein FIG. 3(B) shows the scene without background.

DETAILED DESCRIPTION OF THE INVENTION

Figure 1:
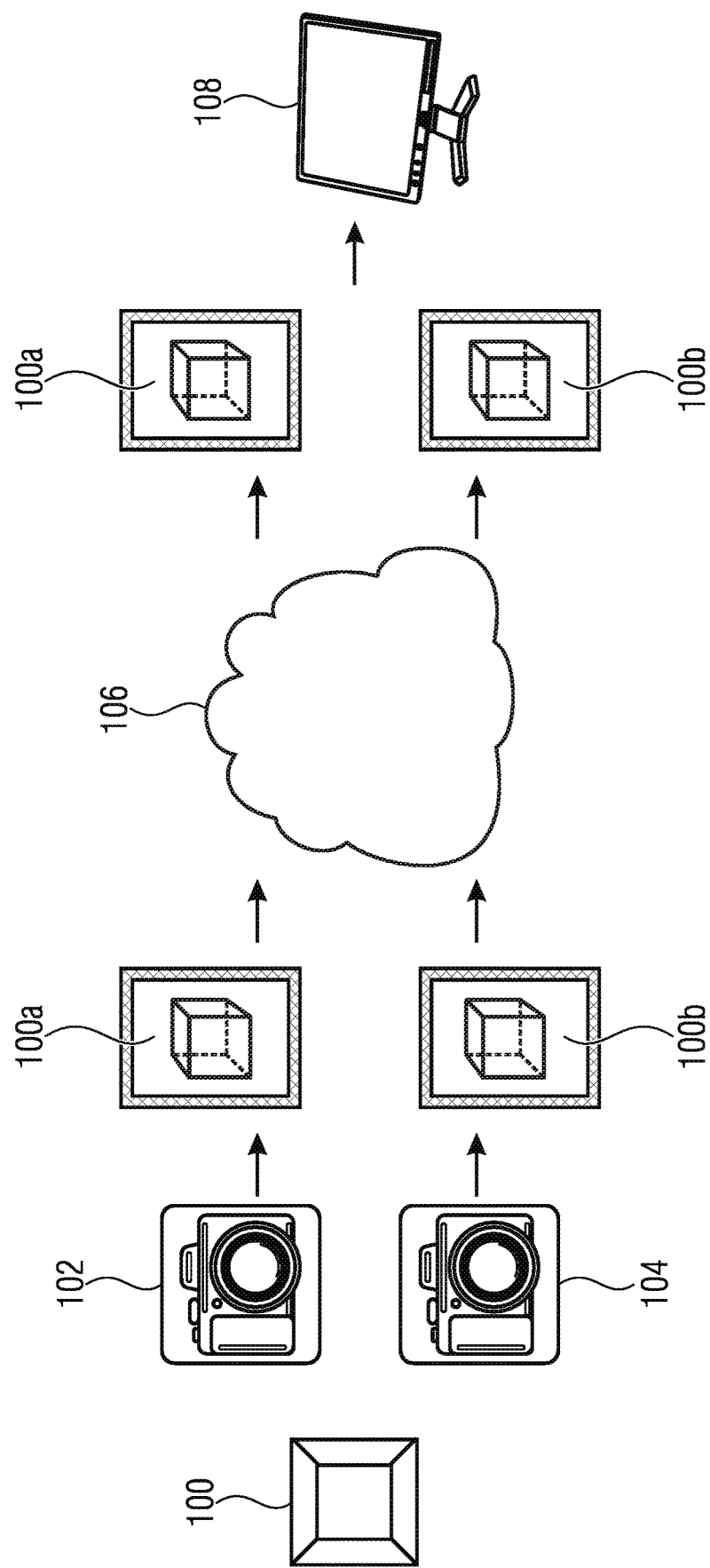
FIG. 1 shows a schematic illustration of a conventional approach for creating, transmitting and representing a stereoscopic film including a multitude of single images.

In the subsequent description of the figures, the same elements or elements having the same effect are provided with the same reference numeral such that their description in the different embodiments is interchangeable.

Figure 8:
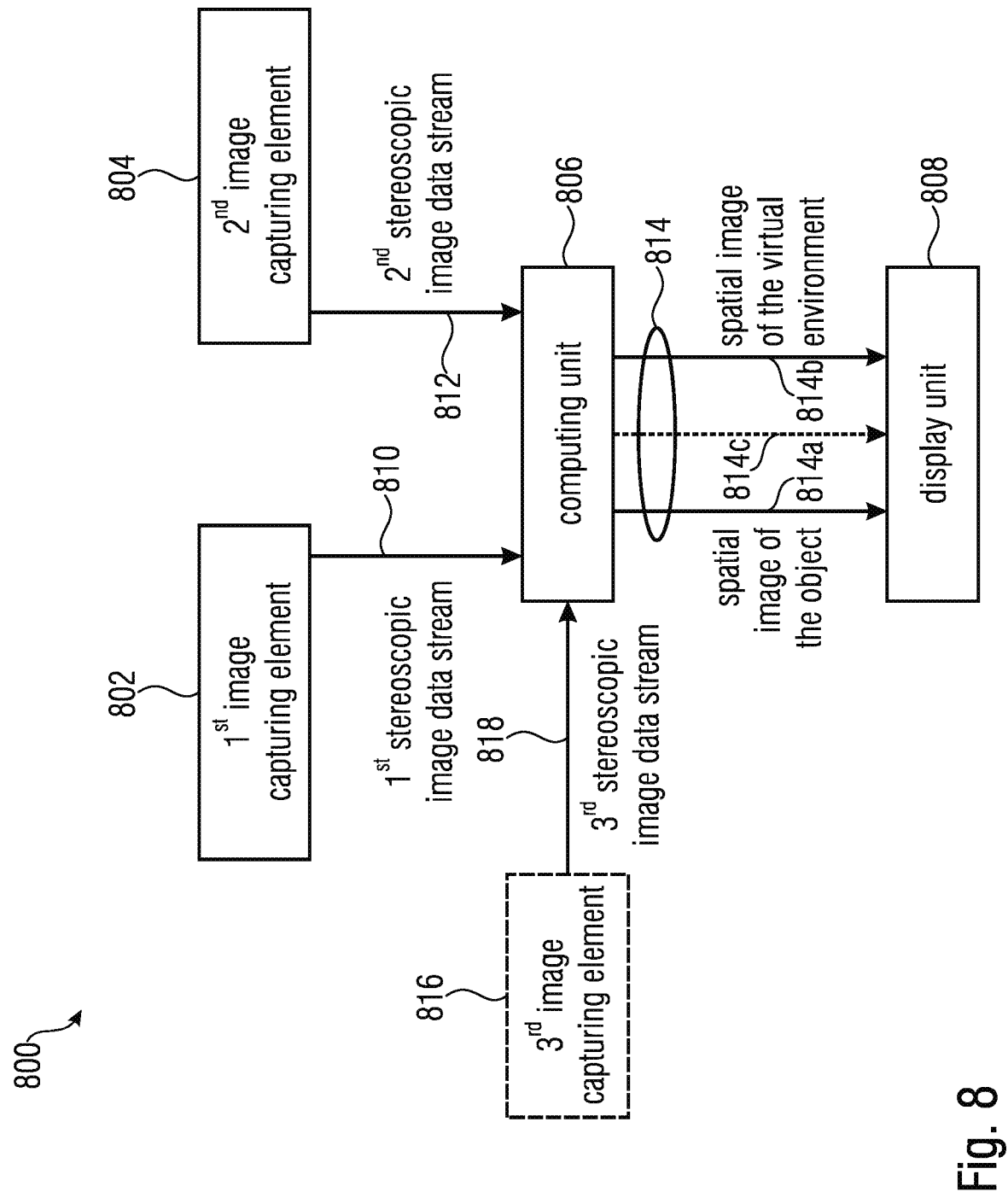
FIG. 8 shows a schematic block diagram of the apparatus for representing a spatial image of an object in a virtual environment.

FIG. 8 shows a schematic block diagram of an apparatus 800 for representing a spatial image of an object in a virtual environment. The apparatus 800 comprises a first image capturing element 802 and a second image capturing element 804. A computing unit 806 may receive and process image data of the two image capturing elements and output it to a display element 808. The first image capturing element 802 may generate a first stereoscopic image data stream 810 of an environment. The image data, e.g. a video, may be used to form the virtual environment. For example, this is a meeting room; however, it may be any other scene into which an object is inserted (as subsequently described). The second image capturing element may generate a second stereoscopic image data stream 812 of the object. The computing unit 806 receives both image data streams 810, 812.

The first and the second image capturing element may be physically different. Thus, they may be different cameras. In this way, it is possible to record the environment spatially and temporally independently of the object, e.g. in an initialization phase. The object may also be located at a different location, e.g. in a space that is optimized to highlight the object against the background by means of chroma keying. Thus, it may be a "blue screen" box or "green screen" box. However, it is also possible for the object to be actually located in the real environment that is then recorded in advance, for example. In this case, the first and the second image capturing elements may also be the same camera; however, that records the environment and the object at different points in time. Thus, the distinction between the first and the second image capturing elements may also be purely functional and not physical.

Nevertheless, it may here be advantageous as well to use different cameras, since a main focus in generating the environment is to create a boundary for the virtual environment in which the reference point may move. Thus, e.g., a 360° stereo camera that records a stereoscopic partial image data stream from a recording point in all spatial directions (or in a plurality of discrete directions) may be used. This recording may further be performed from different recording points in order to be able to adjust disparities proceeding from the reference based on real recordings. If the reference point is spaced apart from a real recording point, the view may also be interpolated, or computed.

However, when recording the object, it is important that it is recorded from all sides so that the reference point may be arranged around the object and so that a representation of the object is possible in an omnidirectional view. Thus, different stereo cameras may here be arranged in the space in which the person to be recorded is located. The stereo cameras may be aimed at the person and may record the same from different sides. For example, 3, 5, or 7, or any other number of stereo cameras may be used for recording in order to record the object simultaneously from different sides and to generate with each camera a stereoscopic partial image data stream from which the second stereoscopic image data stream is combined. Since the stereo cameras typically have a distance to each other, they cannot allow for every possible angle of view of the object. When changing a reference point to an angle of view that deviates from an angle of view of one of the stereo cameras, the computing unit has the possibility to interpolate the view of the object from, e.g., two stereo cameras comprising a similar angle of view. Furthermore, however, a so-called billboard technique may be applied. In this technique, the spatial image of the object is turned towards the reference point such that the angle of view of one of the stereo cameras corresponds to the angle of view from the reference point. Advantageously, the stereo camera being the closest to the angle of view from the reference point is selected as the corresponding stereo camera.

As previously described, the computing unit 806 may receive the first and the second stereoscopic image data streams 810, 812. Proceeding from a reference point, a spatial image of the virtual environment may now be generated based on the first stereoscopic image data stream. In addition, a spatial image of the object, proceeding from the reference point, may be inserted from the second stereoscopic image data stream into the virtual environment. The spatial images may be generated based on disparities that are tuned to a person standing on the reference point and having a specific viewing direction. Thus, the computing unit may perform the 3D rendering, or more precisely, the generation of the spatial images from the stereoscopic image data streams. For adjusting the disparities, the computing unit may first select the stereoscopic partial image data stream of the first stereoscopic image data stream and/or the second stereoscopic image data stream that is closest to the reference point. A possible difference between the reference point and a recording point from which the environment, or the object, has been recorded may be subtracted out. For this, an interpolation between two recording points may be used in addition to other techniques.

Proceeding from the reference point, the display element 808 may display the spatial image of the object in the virtual environment. Thus, the impression of a 3D object in a 3D environment may be given to a viewer of the display element. For example, for displaying, the display element 808 uses the position and the direction which the computing unit has previously used for generating the spatial images. In other words, the display element displays the data 814 that the computing unit provides. This is the spatial image 814a of the object and the spatial image 814b of the virtual environment.

Optionally, the apparatus 800 further comprises a third image capturing element 816. The third image capturing element may have all features of the second image capturing element 804; however, a deviating further object is being recorded by the same. The third image data stream 818 is generated from this further object and is transmitted to the computing unit 806. The computing unit extracts the further object from the $3^{rd}$ stereoscopic image data stream 818, generates an optional spatial image 814c of the further object and inserts the same into the virtual environment. The display element further displays the virtual environment. If, taken into consideration the reference point and the angle of view, the spatial image of the object or the spatial image of the further object is in the viewing direction, the corresponding spatial image is also displayed. The image data streams may be a sequence of single images, e.g. a (live or real time) video, or a video stream.

Figure 9:
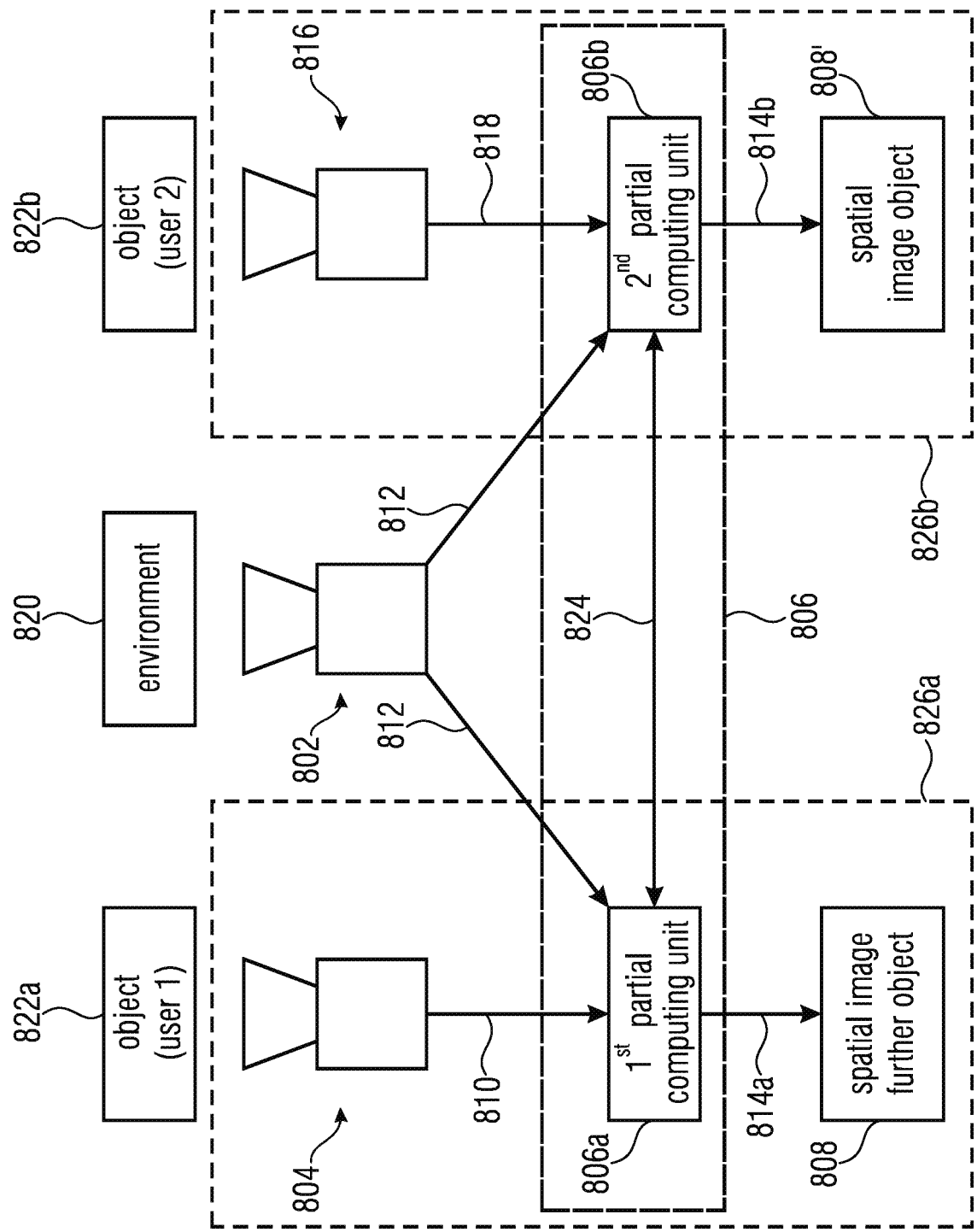
FIG. 9 shows a schematic block diagram of the apparatus for representing a spatial image of an object in a virtual environment according to embodiments.

FIG. 9 shows a schematic block illustration of an embodiment of the apparatus 800. The image capturing element 802 may record the environment 820 before the actual use and may transmit the first stereoscopic image data stream 812 to the computing unit 806. However, the computing unit 806 may be implemented in a decentralized manner such that a sub-computing unit 806a is arranged on the side of a first user 822a and a second sub-computing unit 806b is arranged on the side of a second user 822b. The second image capturing element 804 may now record the first user 822a and the third image capturing element 816 may record the second user 822b and they may generate the second and third stereoscopic image data streams 810 and 818, respectively, and transmit the same to the respective sub-computing unit. Both stereoscopic image data streams may be exchanged between the two sub-computing units via a connection 824. The connection may be implemented via the internet, for example. The first stereoscopic image data stream may also be transmitted via the internet to the first and the second sub-computing units 806a, 806b.

The first sub-computing unit may now generate the spatial image of the further object and the spatial image of the environment and send the two to the display element 808 for representation. Thus, the data stream 814a may comprise the spatial image of the further object as well as the spatial image of the environment. A current position and/or a current viewing direction of the first user 822a may be used as reference point for computing the spatial images, or for determining the depth map. For this, a reference point may be specified in its real environment (usually this is not the environment 820), the reference point being mapped onto a reference point in the virtual environment. A deviation from this reference point in the real environment of the first user may then be transmitted analogously or be provided with a corresponding scaling factor to the virtual environment in order to place the reference point onto the corresponding location in the virtual environment. The same may be done for the orientation of the user.

The spatial image of the environment together with the spatial image of the object may now be represented on the further display element 808'. Here, the object may be arranged on the above-determined reference point and have a viewing direction corresponding to the orientation. The position and/or orientation of the further object 822b, which may be determined analogously to their determination with respect to the object 822a, may now be used as a further reference point. Thus, it is possible that two users located at different locations may meet each other in the same virtual environment and may move freely therein. For this, they are each connected to a computing system 826a, 826b that respectively comprises an image capturing element (one or several stereo cameras), a display element, e.g. a screen or VR (virtual reality) glasses, and a corresponding computer. According to the functionality, other topologies, or divisions into sub-units of the apparatus are possible.

According to embodiments, the second and/or the third image capturing element may record superimposition image data in an initialization phase, i.e. before the actual operation of the apparatus. For example, this superimposition image data is the eyes or the face of the first and/or the second user. This superimposition image data may also be recorded once for repeated use and may then be re-used in any operating mode. For example, it may be used if the objects, i.e. in this case the users, wear VR glasses (in the operating mode). By means of the superimposition image data, the computing unit may now remove the VR glasses, or superimpose the same with the superimposition image data so that the VR glasses are no longer visible. Thus, the users have the impression that the respective other user is filmed without VR glasses although both users wear such glasses. The computing unit may further extract the superimposition image data in the initialization phase from a corresponding image, or a corresponding image data stream, and store the same in a memory of the computing unit, e.g. same as the image data stream 812. The display element may display the spatial image of the object, e.g. a user, with the superimposed, or textured, superimposition image data. The superimposition image data may be static (single image) or dynamic ([short] video sequence).

Alternatively, other forms of superimposition image data are conceivable. Thus, instead of the eye area, it is possible to superimpose, e.g., the face of a (famous) person over the face of the spatial image of the object. Alternatively, it is also conceivable to cover one's own face, or eye area, with a mask, in order to keep one's anonymity in a chatroom, for example. Such a mask may also be extracted, e.g., from a corresponding stereographic photo, or video, without an explicit recording. Optionally, a computer animation is also conceivable here, since the real impression is not important when using a mask. In order to be able to insert the superimposition image data at the exact position in the object, natural markers such as the nose, ears or mouth of the object may be used. Alternatively, external markers such as light-emitting diodes/lamps or reflectors may be attached to the object.

According to embodiments, the computing unit is configured to determine a current appearance of the object 822a, 822b and to adapt the superimposition image data based on the determined current appearance. For example, the appearance is a smile or any other facial expression of a person. This may be determined from the facial features, e.g. the corners of the mouth. Static superimposition data, e.g. a single image, may be manipulated such that the eye area in the superimposition image data is adapted to the current facial expression. Thus, by means of image processing algorithms, the eye area may be processed such that the eyes look slightly pinched together to represent a smile. Thus, dynamics may be generated in the superimposition image data. According to further embodiments, a plurality of superimposition image data may be created, e.g. of different facial expressions. Thus, the current position of the corners of the mouth of the person may be compared to the position of the corners of the mouth in the superimposition image data. Thus, it is possible to select the superimposition image that best reflects the current facial expression and to superimpose the entire face or only the eye area of the spatial image with the superimposition image data. Thus, from the static superimposition image data, dynamics in the superimposition image data may here also be generated. In other words, the computing unit may select superimposition image data from a plurality of superimposition image data based on the determined current appearance and superimpose the selected superimposition image data onto parts of the object.

In other words, the image capturing element may be configured to, in the initialization phase, scan an eye area or a face of a person as the object and to store it as superimposition image data, the computing unit being configured to, in the operating mode, superimpose data glasses worn by the person with the superimposition images obtained in the initialization phase. Thus, the computing unit may adapt the eye area or the face of the superimposition image data based on a mood of the person and may superimpose the adapted superimposition image data onto the person. In addition, the imaging unit may create a plurality of superimposition image data, the computing unit being configured to compare the mood based on a comparison of a current position of the corners of the mouth of the person with respect to a position of the corners of the mouth in the plurality of superimposition image data and to select the superimposition image that best reflects the current facial expression.

According to embodiments, the current appearance of the object may be determined 30 to 60 times per second, 35 to 55 times per second, or 40 to 50 times per second. Advantageously, the current appearance of the object, e.g. the facial expression of a person, may be determined for each image, or for each frame, of the image data stream as an average value or median from a plurality of images or frames of the image data stream. Accordingly, the image data stream may comprise 30 to 60 images per second, 35 to 55 images per second, or 40 to 50 images per second or a multiple thereof. This comparably high refresh rate makes it possible to update the spatial image in the virtual environment in real time, i.e., assuming a sufficient transfer speed, there is no difference visible to human beings between the object in the real environment and the object in the virtual environment.

According to an embodiment, the latency, or delay, of the object in the virtual environment compared to the object in the real environment is less than 50 ms, less than 30 ms, or less than 20 ms.

Furthermore, it is possible for a user to adapt his/her angle of view in the virtual environment 820 independently of his/her position in the virtual environment, e.g. by means of an input device. Thus, the user may obtain an individual view of an external viewer (third person view) on the spatial images of himself/herself and the other user in the virtual environment 820. Users may virtually sit opposite each other and hold their meetings in the virtual conference room. Furthermore, it is also possible to integrate visual objects as a model, a spatial image and/or a hologram into the virtual conference room. Thus, for example, the (true to original) model of an object such as a car may be integrated into the conference room from a further location, wherein the orientation, size and/or level of detail may be individually and independently adapted by each of the two people.

Embodiments show that the image data stream and the superimposition image data are generated, or recorded, by a camera. Thus, the user may be given an improved impression of reality as compared to computer-generated avatars or avatars in which, e.g., only the upper body is recorded and computer-animated legs are inserted in order to give the avatar the possibility to move in the virtual world. The recorded camera image may be transferred into a 3D spatial image by means of the approach described in FIGS. 1 to 7 in order to enable a reduction of the amount of data to be transferred. However, the data reduction is not limited to this method, and is entirely optional since the uncompressed recorded camera images may be transmitted. Particularly for the image data stream, a compression of the video, or the individual images of the image data stream, is advantageous.

The superimposition image data may be recorded in advance and stored in the computing unit. Since a field of application of the described apparatus is a virtual meeting room, or conference room, the computing unit may be arranged in a decentral manner at the participants of the conference. In order to be able to use the superimposition image data in an efficient manner, e.g., they may be exchanged between, or be sent to, the sub-computing units of all participants once, for example. For this, the recorded images and/or photos or video sequences of the superimposition image data may be used without being converted into a corresponding computer model.

In order to separate the recorded objects in the image data stream and/or the superimposition image data from their real background, they may be recorded, e.g., in a "green box" (in front of a green or a blue background) so that the object may be inserted into the virtual environment by means of chroma keying.

Embodiments further show that the apparatus shown may be used for visualizing cosmetic corrections. For example, differently made-up lips may be stored as superimposition image data so that the user may superimpose the accordingly made-up lips of his/her choice onto his/her own lips selected from the set of stored superimposition image data. Thus, users may get a better impression of whether the lipstick color they choose matches the rest of their outfit, as they see both in combination. In order to generate the superimposition image data, the user may apply various lipsticks once in advance or in an initialization phase and store the superimposition image data as a recording of his/her own lips. In addition, the user may therefore put on make-up in the virtual world and therefore also for a (professional) conversation without having to spend time on make-up in real life. Additionally or alternatively, for example, the manufacturers of lipsticks may provide corresponding samples as superimposition image data. The lips were selected here as examples, but the principle may be used for any cosmetic corrections, such as a different hairstyle or hair color. This also allows the retouching of existing reading or other glasses.

A similar principle may be applied for the general change of (facial) attributes. Thus, the superimposition image data may be processed (with the computer) such that certain attributes of the user are changed. For example, this principle may be used in plastic surgery in order to give the user an impression as to how he/she will look after a potential surgery.

A corresponding method for representing a spatial image of an object in a virtual environment may comprise the following steps: generating a first stereoscopic image data stream of an environment; generating a second stereoscopic image data stream of the object; receiving the first and second stereoscopic image data streams; generating a spatial image of the virtual environment, proceeding from a reference point, based on the first stereoscopic image data stream; inserting the object, proceeding from the reference point, from the second stereoscopic image data stream into the virtual environment; and displaying, proceeding from the reference point, the spatial image of the object in the virtual environment. Further implementations of the apparatus may be applied correspondingly to the method.

In order to reduce the amount of data in the transfer, i.e. to relieve the load on the connection 824 of FIG. 9, the technique subsequently described with respect to FIGS. 1 to 7 may be used. Here, the amount of data may be reduced with respect to the known methods generating the spatial images, therefore ensuring a sufficient transfer speed also with a low bandwidth. Thus, the computing unit may already perform processing in the image capturing elements. As is subsequently described, a grid model of the object may be generated, e.g., from the second stereoscopic image data stream. However, the grid model is invisible to the user; however, it contains the depth information of the object from the corresponding angle of view of the stereo camera used. Then, the grid model may be inserted into the virtual environment and may be superimposed with the video images without depth information. Thus, the transfer of an image data stream of the stereoscopic image data stream (this contains at least two image data streams) is sufficient to obtain the real recording of the object and also the corresponding depth information for generating the spatial image of the object.

The following describes embodiments, particularly for creating the model and/or the spatial image of the object, with respect to FIG. 1 to FIG. 7. The terms model and spatial image refer to the same element, the image of the object in the virtual environment. However, spatial image already implies the generation by means of stereoscopic image data, whereas in the model, a single image data stream is sufficient. However, all embodiments directed to a model may also be analogously transferred to a spatial image. According to embodiments, the model comprises a reduced amount of data in the storage or transfer of the model. Thus, the above-mentioned embodiments may also be performed with low transfer rates, or bandwidths, in real time. However, the subsequent embodiments are to be considered as examples and do not limit the creation of the model to the same. In other words, the models may also be created in alternative methods.

Different approaches are known in order to generate and display a three-dimensional representation of an object, e.g. in the form of a sequence of individual images or of a 3D film. FIG. 1 shows a schematic illustration of a conventional approach for creating, transferring and representing a stereoscopic film including a multitude of individual images. For simplicity reasons, a cube 100 is illustrated in FIG. 1 as the object to be represented. A first camera 102 generates a first recording 100*a* of the cube from a first perspective, and a second camera 104 generates a second recording 100*b* of the cube from a second perspective that differs from the first perspective. In other words, the recordings 100*a* and 100*b* of the cube 100 are generated from different angles of view. The individual images 100*a* and 100*b* created and received in such a way are provided to an appropriate stereoscopic reproduction unit 108, e.g. a screen, for representation. Instead of the cameras 102 and 104, a mutual 3D camera may be used which also generates two recordings of the object 100 that are then transferred in the above-described manner to the screen 108 in order to be represented.

The conventional approach described based on FIG. 1 has a disadvantage since the amount of data of at least two images 100*a* and 100*b* to be transferred via the transfer medium 106 is very large, which goes hand in hand with a correspondingly high data transfer time. Even with a compression of the two-dimensional recordings or images 100*a*, 100*b*, the duration needed for compressing the data is large so that the overall transfer time from the point where the image of the object 100 is generated to the point where the three-dimensional reproduction is to take place is very long. For example, a stereoscopic recording of a cube 100 is assumed, and the approach described based on FIG. 1 needs for the transfer of the data needed to represent a single image of the cube at the screen 108 the following memory space on the basis of an image size of 1024×768 pixels: 2 images×1024(X value)×768(Y value)×3(RGB color value)=4718592 byte.

This large amount of data leads to the high transfer times mentioned above and makes the transfer of moving images of a moving object in a three-dimensional implementation almost impossible since this needs a transfer of up to 30 frames per second, each frame comprising the above-mentioned amount of data. Thus, such a transfer of a moving object 100 whose movement is to be represented three-dimensionally at the side of the receiver 108 is only possible with a high delay so that a live stream or the like is not possible, in particular. A transmission of a 3D film is also almost impossible due to the bandwidth needed.

The above-mentioned transmission of a live stream in three-dimensional quality, or the transmission of a three-dimensional live sequence, is desired in connection with recording people and surrounding spaces. Recording people and surrounding spaces using 3D cameras, and the reproduction as a 3D film has the above-mentioned problem of the large amounts of data that may not be transferred in the internet, which arises from the fact that they have to be stored and transferred as a conventional sequence of 2D images. State-of-the-art approaches deal with coding and transmission of 2D image data as video recordings; however, the amount of data and the coding time resulting therefrom is too extensive for this two-dimensional solution in connection with 3D image data so that the underlying problem of the transfer of the data needed in order to three-dimensionally represent an object, e.g. as moving image, remains.

Figure 2:
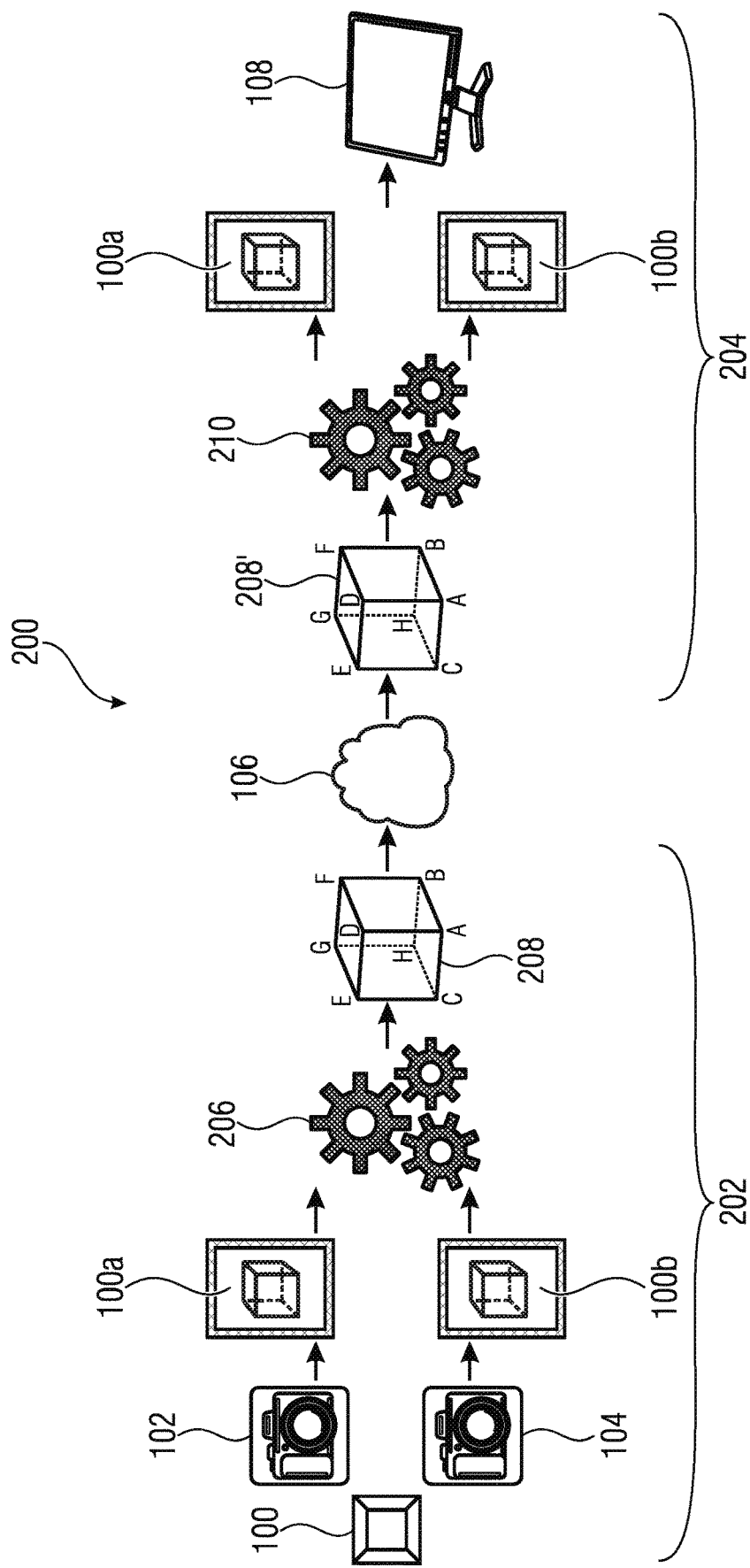
FIG. 2 shows a schematic illustration of an approach for manufacturing, transmitting and representing a stereoscopic film with single models generated from a 3D engine.

FIG. 2 shows a schematic illustration of an approach for creating, transferring and representing a stereoscopic film with single models generated from a 3D engine. Similar to FIG. 1, FIG. 2 also uses the three-dimensional image of a cube 100 as the basis for describing the approach. FIG. 2 shows a schematic overall illustration of the system 200 according to embodiments for generating a three-dimensional representation of at least one part of an object, i.e. the cube 100. The system 100 includes the transfer medium 106 already described based on FIG. 1, which is arranged at a transmitter side 202 and at a receiver side 204. Elements that were already described based on FIG. 1 are provided in FIG. 2 with the same reference numerals and are not explained in detail.

The transmitter side 202 shown in FIG. 2 may, e.g., include an apparatus for generating data for a three-dimensional representation of at least one part of an object, wherein the apparatus according to the embodiment shown includes a 3D engine 206 that is schematically illustrated in FIG. 2 and that receives as an input the 3D recording including the two images 100a and 100b of the cube 100. Based on the 3D recording, the 3D engine generates a model 208 of the cube 100 including the vertices A to H arranged at different positions in the space. Depending on the different perspectives from which the cube 100 is recorded, the 3D model generated by the 3D engine 206 includes either the entire object, i.e. the entire cube 100, or only part of the cube 100. In the embodiment illustrated in FIG. 2, it is assumed that only a single 3D recording of the cube 100 from one perspective exists so that the 3D model, according to this embodiment, would only represent the front side and the top side of the cube, and the vertices A to G exist accordingly.

In other embodiments, it may be provided for the cube to be recorded from a second perspective that differs from the first perspective so that its back side and, if applicable, its bottom side may be imaged as a model, in this case, the 3D engine 206 would generate based on the input data, i.e. based on the two 3D recordings, a 3D model of the cube 208 including the vertices A to H, i.e. a 3D model that may be viewed from all sides.

According to embodiments, the 3D engine 206 is operable to define the 3D model 208 of the cube 100 in the form of the vertices A to H and as color values assigned to the corresponding vertices. The scene recorded by the camera 102, 104, e.g. which includes the cube 100, delivers at the output of the 3D engine 206 a single image including color values and depth information. According to an embodiment, the color values respectively consist of one byte for red, one byte for green and one byte for blue (RGB color values), i.e. of a total of 3 bytes. The depth information includes the X, Y and Z values for the vertices of the 3D model in the three-dimensional space. According to embodiments, the X, Y and Z values may each be stored as floating-point numbers with simple accuracy, e.g., with a length of 32 bits. The sequence of X, Y and Z values is referred to as vertices, and the set of all vertices of the 3D model 208 is referred to as point cloud.

Comparing the approach according to the state of the art as described based on FIG. 1 and the above-described approach, there is a massive reduction of data due to the representation of the object 100 in the form of a 3D model which is defined via the vertices and color values. As already described above, conventional approaches generate for a cube a data set to be transferred having a size of 4718592 bytes, on the basis of images having a solution of 1024×768 pixels, so that the stated number of bytes results with two images and three color values. In contrast, the above approach has a significant advantage since a massive reduction of the amount of data is achieved, since, e.g. in the approach illustrated in FIG. 2, assuming that the 3D model 208 represents a complete image of the cube 100, only 8 vertices having a floating-point value of 4 bytes each are needed, and 3 bytes each as color value, so that only 8×4×3×bytes=96 bytes are needed as the amount of data for a frame/a single image for representing the 3D object 100.

With respect to FIG. 2, it is to be noted that the example of generating data for the three-dimensional representation of a cube 100 shown therein does not constitute a limitation, actually, the object 100 may be any element having an arbitrarily complex structure, e.g., it may also be a representation of a person or a machine. The 3D engines shown in FIG. 2 may, e.g., be realized by means of computer systems that, if applicable, are equipped with the hardware to generate 3D models and on which corresponding software is provided for the execution.

According to embodiments, the apparatus 202 is configured to repeatedly generate a 3D recording 100a, 100b of the object 100 in order to provide data for a multitude of successive frames for the transfer via the medium 106 in order to represent a 3D live sequence, or a 3D film, on the receiver side 204. According to embodiments, in order to achieve this, up to 30 frames are generated per second by means of the apparatus 202, i.e. up to 30 single images of the object 100 are recorded. According to the above discussions, each single image is coded via the 3D engine 206 using the 3D model so that each of the 30 frames per second contains a data set that contains the vertices and the color values of the object 100 that are assigned to the vertices at the time of recording.

The apparatus 202 and the method implemented therewith are advantageous since an amount of data transferred via the transfer medium 106 is significantly reduced, which also significantly reduces the transfer time. Thus, the time for computing the 3D models is shorter than for compressing single images according to the state of the art. In addition, the complete transmission of the 3D information via the 3D model enables on the receiver side the possibility to freely select a viewpoint onto the object on the receiver side since the actual images are generated and displayed by a 3D engine on the receiver side at run time after the transfer of the 3D model data. More precisely, according to embodiments, the data (the data set) describing the 3D model 208 generated on the transmitter side is transferred via the transfer medium 106 to the receiver side 204 so that the corresponding data describing the 3D model 208' is present at the receiver side 204. This data is supplied to a 3D engine 210 that generates the 3D recording of the object in the corresponding frame, e.g. the two recordings 100a, 100b, on the basis of the 3D model, which are then, as in the conventional technology, provided to an appropriate screen 108 or any other appropriate display device for the three-dimensional representation of the object on the receiver side 204.

Thus, according to embodiments, an approach is taught in which a transfer of a sequence of single 3D models is performed, instead of a transfer of a sequence of single 2D images, as is the case in the conventional technology. The 3D models 208 are generated by means of the 3D engine 206 before the transfer, wherein the 3D engine recognizes, e.g. from the images 100a, 100b, edges and generates the 3D model based on the recognized edges. For example, the 3D engine 206 may determine common regions in the images 100a, 100b, e.g. common edges that belong to the object 100 in order to determine therefrom the resulting 3D model, or 3D grid (mesh), of the object 100. After the transfer, the 3D model described by the vertices and color values is reconverted by means of the 3D engine 210 on the receiver side into the two images 100a and 100b in order to represent the 3D object from different angles of view with the single images 100a and 100b that are then displayed on the stereoscopic output device 108.

The following describes embodiments. It is assumed that a person located within a scene is to be recorded as the object. The scene includes the human being that stands in a space and, e.g., moves slightly back and forth at his/her place. According to embodiments, it is provided for the apparatus 202 (cf. FIG. 2) to record 30 frames of this scene per second and generates for each frame a corresponding 3D model of the scene and describes the same by means of the vertices and color values. The data generated in such a way for each frame (each single image) includes, as previously mentioned, the color values and the depth information, e.g. RGB values and X, Y and Z values, that each defines a vertex, wherein the plurality of the vertices forms a point cloud. According to embodiments, it may be desired to extract the background from the scene, e.g. in case if only the representation of the person is to be transferred to the receiver side 204 (cf. FIG. 2) and is there to be displayed with another background that is either transferred from the transmitter to the receiver in advance or simultaneously or is preset at the receiver, for example. In order to remove the background, the background is first extracted from each individual point cloud, i.e. the vertices that are recognized as being assigned to the background are deleted from the multitude of vertices existing for a single image (=single point cloud). According to embodiments, the Z value of each individual vertex is compared to a corridor distance (threshold value distance) of the standing area of the person to be represented, and distances indicating that a vertex is further away or closer than the corridor distance are recognized as the background vertex and are omitted, i.e. only the vertices are allowed that are within the corridor distance, and the data obtained in such a way is the data that images the person in a point cloud. In other words, the number of vertices that define the point cloud per single image is reduced by the vertices that are uniquely assigned to the background.

Figure 3A:
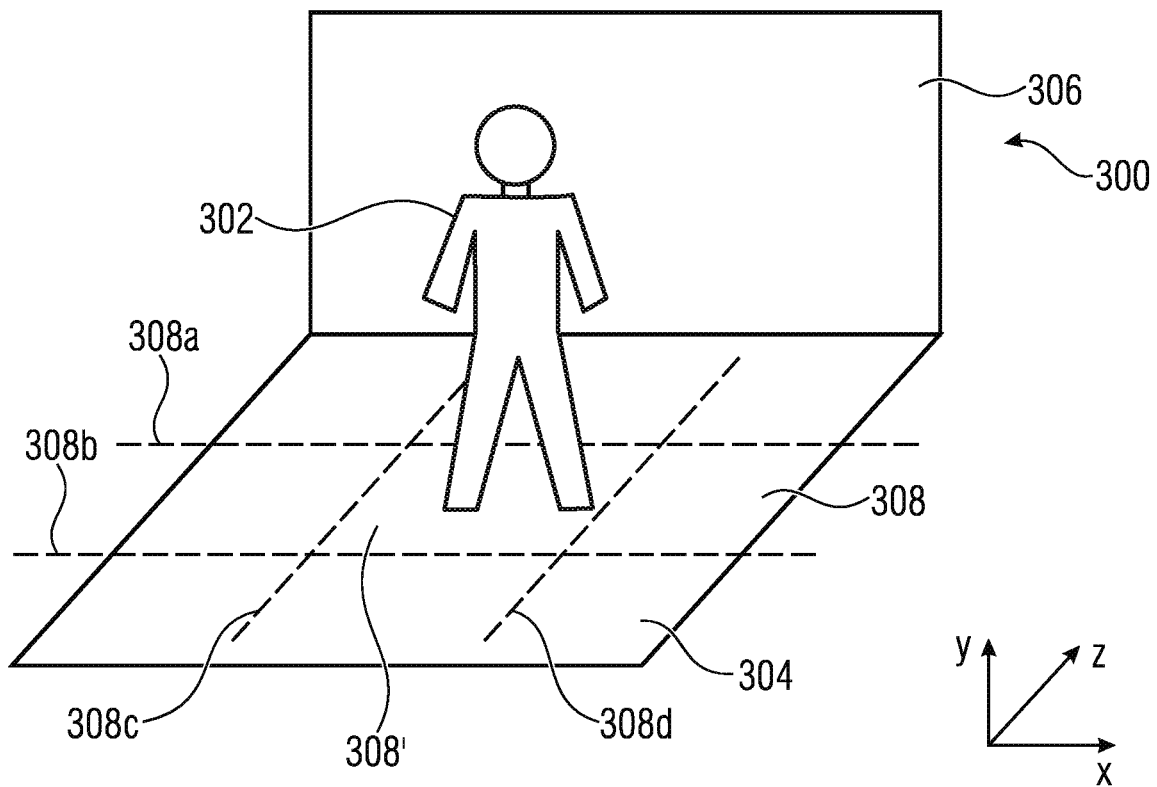
Figure 3B:
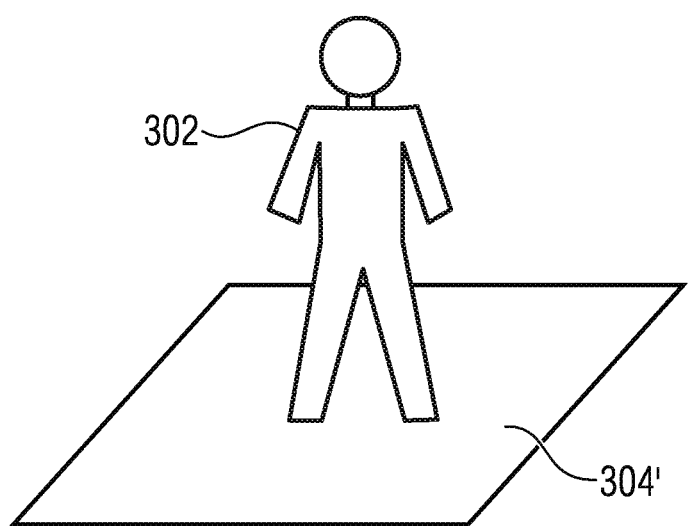

FIG. 3 schematically shows this approach, wherein FIG. 3(A) shows the initially recorded scene 300, in which a person 302 (object) is illustrated as standing on a floor 304. Furthermore, a back wall 306 is illustrated. The region 308 that is limited by the dotted lines 308a, 308b extending in the X direction is illustrated along the Z coordinate. The region 308 is the above-mentioned threshold value corridor, and according to embodiments, vertices of a 3D model that has been generated due to the 3D recording of the scene 300 are omitted if the same are outside of the threshold value corridor 308, so that the illustration shown in FIG. 3(B) results, wherein only the person 302 as well as a part of the floor 304' remain.

In further embodiments, it may additionally be provided for the threshold value corridor to be limited also in the X direction, as is illustrated by the dotted lines 308c and 308d in FIG. 3(A). Vertices having X values outside of the region 308' are omitted from the data describing the 3D model based on the scene 300 such that the remaining floor area 304' may be further reduced.

The data model of the person 302 (cf. e.g. FIG. 3(B)) generated by the 3D engine may, e.g., be a grid model or a triangle mesh, depending on the 3D engine used. At the outer edge of the triangle mesh that remains after cutting off or extracting the background, unprecise depth values that result in erroneous sections of the 3D model, e.g. in triangles with a great depth, may arise due to noise. According to embodiments, the edge area of the 3D model may be smoothed by a smoothing algorithm, e.g. by a smoothing algorithm that filters out large depth values or depth distances.

As mentioned above, an object 100, 302 may be recorded from several perspectives. A reason for the several recordings may be to image the object entirely such that a complete 3D model is available. In such a case, and also in a case in which only a part of the object, e.g. a front side of a person or an object, is to be imaged, there may be a situation in which, due to the design of the object, e.g. due to a part of the body of a person being covered by a hand of the person or due to a protruding portion of an object, portions located behind are not captured by a 3D recording. In the 3D recording, this creates so-called holes that are recognizable as black regions in the 3D model, e.g. in the triangle grid. When using a 3D camera, these holes are created by the distance of the infrared sensor and the imaging camera being a few centimeters so that the view pyramids of both sensors do not completely overlap. Thus, regions that are not based on a triangle mesh, or a portion of the 3D model, and also regions that do not have any image texture are created by means of perspective covers, e.g. a hand of a person in front of his/her body.

According to embodiments, this problem is solved by using at least two 3D cameras, wherein, according to other embodiments, more than two 3D cameras arranged at a distance to each other may be used, so that the 3D recordings generated therewith at least partially overlap. This makes it possible to cover the regions of a first 3D recording in which there is one of the above-mentioned holes by means of the 3D recording of the further camera(s). For example, a triangle mesh is created by triangulation from the vertices of each 3D recording, i.e. from the different point clouds of the different 3D recordings, and the recorded images are projected onto this triangular mesh. For example, triangulation may be performed using the method according to Delauny or using an elevation field. If both triangle meshes are placed on top of each other, no black regions may be seen without 3D information and/or color information.

The textured 3D models, or triangle meshes, of different overlapping views of the person obtained in the above-described way are subsequently connected, according to embodiments, into a 360° omnidirectional view. Two overlapping triangle meshes are brought to cover one another in overlapping regions and, starting from a specified plane, e.g. a horizontal plane (X-Z plane), the vertices that have a predetermined distance to each other are identified. The amount of data arises depending on the selection of the distance, and the distance may be varied depending on the circumstances. For example, when knowing the transfer medium, the amount of data may be adapted to a bandwidth depending on the later transfer of the data, and the distance may be determined accordingly. The identified points are combined into a new triangle mesh, and if a set of points, e.g. a circular set of points, is found on a plane, the method proceeds to the next higher plane, which is repeated until the relevant point cloud or the relevant vertices are found for the outer shell of the object. As a result, a textured, connected point cloud of the outer shell of the object is obtained as a frame, in short: a multitude of X, Y, Z values with an order.

Figure 4:
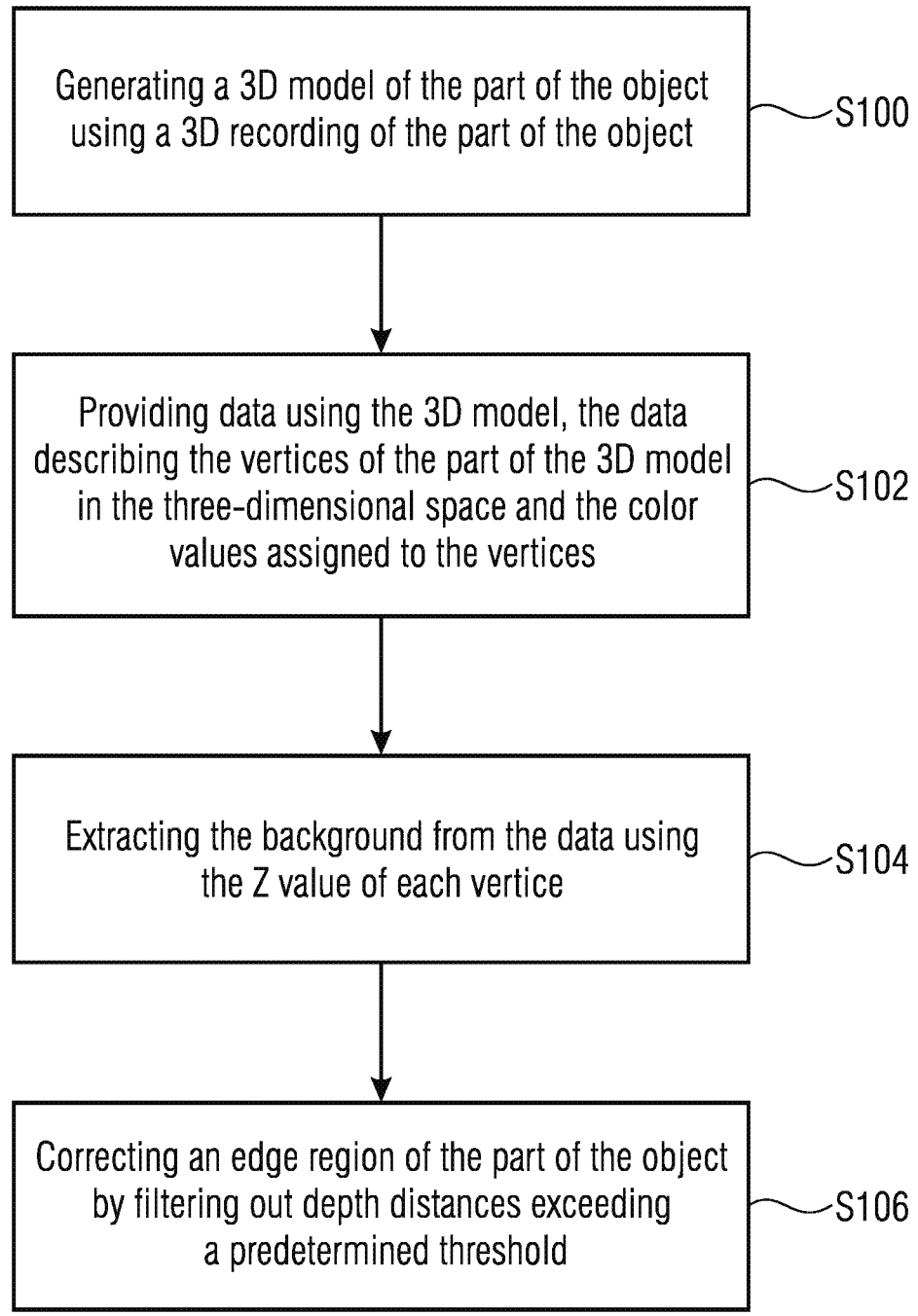
FIG. 4 shows a flow diagram of an embodiment of the method according to embodiments for generating data for a three-dimensional representation of at least one part of an object.

FIG. 4 shows a flow chart diagram of an embodiment of the method for generating data for a three-dimensional representation of at least one part of an object, as was described above. In a first step S100, a 3D model of the part of the object is generated using a 3D recording of the part of the object. In step S102, data that describes the vertices of the part of the object in a three-dimensional space and the color values assigned to the vertices is provided using the 3D model. As an optional step, the method includes extracting S104 the background from the data using the Z value of each vertex as was described above, and as a further optional step, correcting S106 an edge region of the object by filtering out depth distances that exceed a predetermined threshold value, as was described above. According to embodiments, the correction of the edge region may include anti-aliasing and avoiding spikes containing the large depth values having a steep slope. According to embodiments, the steps S100 to S106 are repeated for generating a 3D live sequence, or a 3D film, for each frame of the sequence/the film, wherein each frame is a single image of the sequence/the film. According to embodiments, the refresh rate is 30 frames per second. According to embodiments, texture information between the vertex values may be interpolated and therefore involve little data width.

Figure 5:
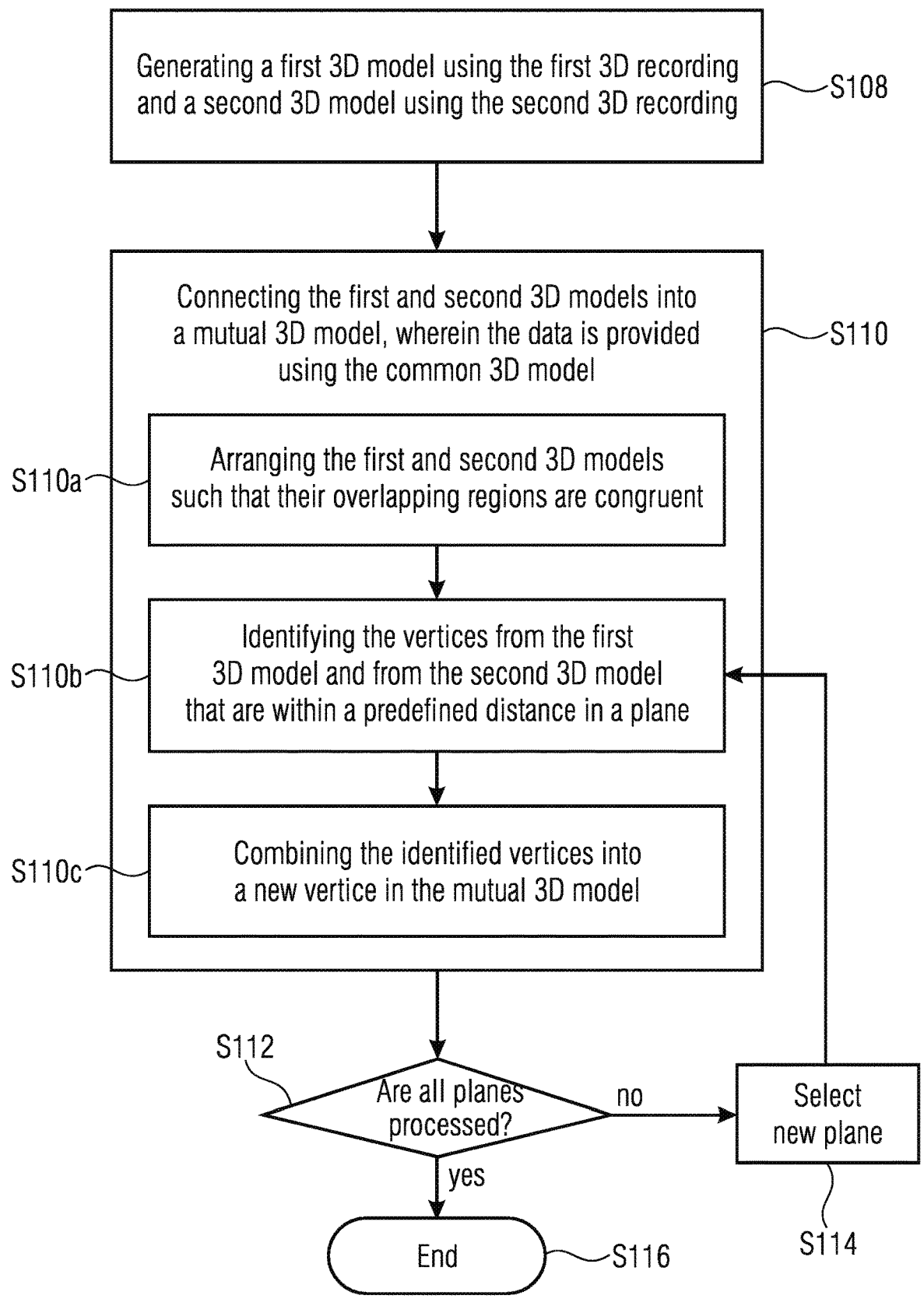
FIG. 5 shows a flow diagram of an embodiment, wherein the 3D model is generated using at least one first 3D recording and one second 3D recording of the object from different, at least partially overlapping positions.

FIG. 5 shows a flow diagram with further steps according to embodiments, in which the 3D model is generated using at least one first 3D recording and one second 3D recording of the object from respectively different, at least partially overlapping positions. In step S108, a first 3D model is generated using the first 3D recording, and a second 3D model is generated using the second 3D recording. In step S110, the first 3D model and the second 3D model are connected to generate a mutual 3D model, wherein the data provided in step S102 (cf. FIG. 4) is generated and provided using the mutual 3D model. According to the illustrated embodiment, connecting the two 3D models includes the step S110*a*, in which the two 3D models are arranged such that their overlapping regions are flush. In step S110*b*, the vertices that are within a predefined distance are defined and the identified vertices are combined in step S110*c*. The steps S110*a* to S110*c* are repeated if it was determined in step S112 that the 3D model has not yet been processed with respect to all predefined planes. In this case, in step S114, a further plane is selected, and the method returns to step S110*b*. Otherwise, if it is determined in step S112 that all planes have been processed, the method ends in step S116.

The embodiments described based on FIGS. 4 and 5 were described in connection with the generation of 3D representations of an object or a person; however, the described embodiments are not limited thereto. According to other embodiments, the object may also be the background of a space that is to be displayed on the receiver side in such a way that a user on the receiver side may view the space from different perspectives and may move within predefined borders in the space. In this case, the 3D recording includes a 3D recording of the background of a space, e.g. according to the steps S100 to S116; however without the step S104, since removing the background would not be useful at this point. In the method according to FIG. 5, a connection of the different recordings of the interior space is performed by the steps in block S110 in order to generate the inner shell of the space. According to embodiments, in a representation of the three-dimensional space generated in such a way on the receiver side, it may be provided for a region to be defined, e.g. a circular region, in which a user may "move freely" in order to obtain the illusion of a live 3D movie.

In the following, a further embodiment is described in more detail, which opens up the possibility of changing a human face. Such approaches are about modifying a recording of a person that looks similar to a, e.g. known, person, e.g. in the region of the face, in such a way that the similarity increases. In this embodiment, a change of the 3D model, or the triangle mesh, is caused with high frequency and the resulting animation consists, as is the case in a film, of a sequence of completely new triangle meshes that are displayed successively to give the human viewer the impression of a moving image. This results in a continuous movement in three dimensions for the human eye since the eyes may no longer distinguish the discrete states as they follow each other too quickly. If these changes are displayed quickly enough on an auto-stereoscopic screen, a hologram illusion arises for a person seeing with two eyes. This hologram illusion may be changed at run time.

Figure 6:
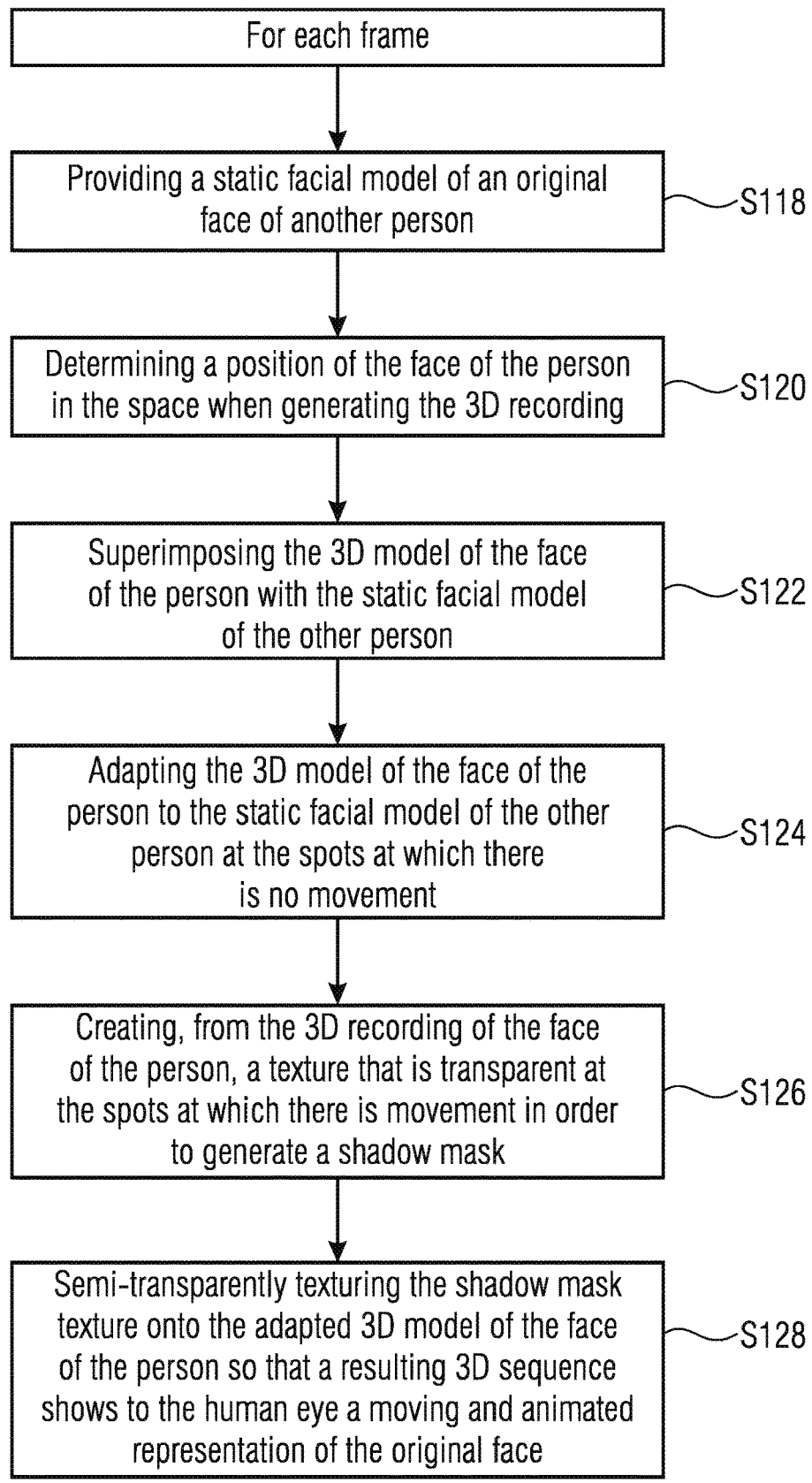
FIG. 6 shows a flow diagram illustrating an embodiment for changing a human face.

FIG. 6 shows a flow diagram illustrating the embodiment for changing a human face. The method is based on an object that represents the face of a person, and, in step S118, a static facial model of an original face of another person is first provided. For example, the first person may be a so-called look-a-like person that looks similar to the other person, e.g. a known person. The facial model of the original face of the other person is a static 3D model with a texture, e.g. created from a photo or film recording of the other person, and may therefore have a correspondingly high recognition effect.

In step S120, a position of the face of the person in the space is determined during the generation of the 3D recording. For this, e.g., position determination equipment such as Nexonar, a device equipped with a sonar sensor that is carried at the back of the head, or ray casting may be used. After determining the position of the face, in step S122, the 3D model of the face of the person is superimposed with the static facial model of the other person and, in step S124, at the spots at which there is no movement, an adaption of the 3D model of the face of the person is carried out with respect to the static facial model of the other person. For this, e.g., the difference from the two 3D models or triangle grids may be added at the spots at which there is no movement, e.g. in the region of the nose, the cheeks and the like, so that a common 3D model or 3D mesh results which updates itself at runtime due to the fact that the above-described steps are performed for each frame/each individual image of the 3D film.

In step S126, a texture from the 3D recording of the face of the person is created, i.e. at the spots at which there is a movement, in order to generate a shadow mask texture that is textured in a semi-transparent manner in step S128 onto the common or new 3D model in order to obtain a 3D model at runtime that may be recognized by the human eyes as a sequence of a moving and animated representation of the original face.

Figure 7:
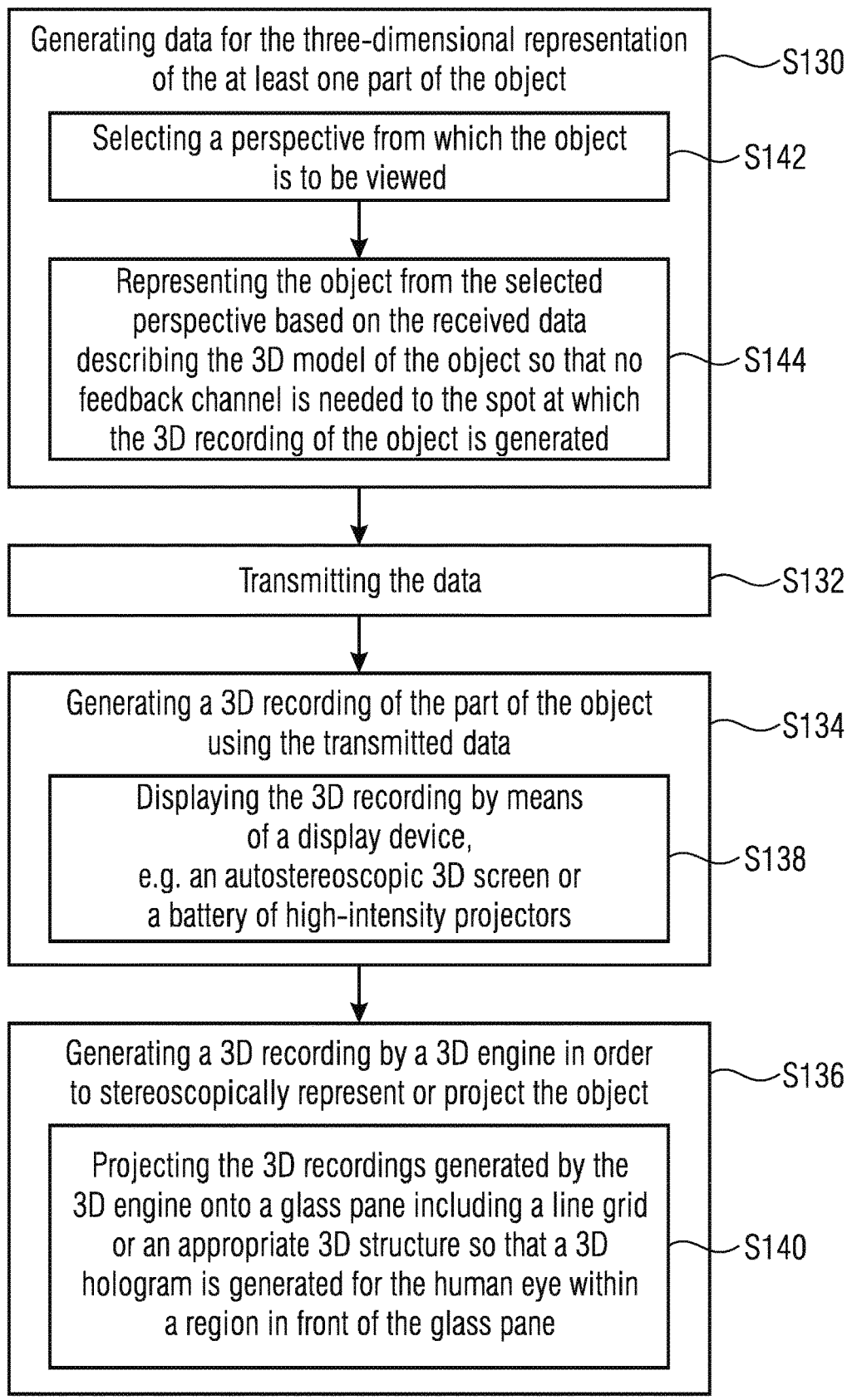
FIG. 7 shows a flow diagram of an embodiment of the described method for generating a three-dimensional representation of at least one part of an object, as is performed by the system described based on FIG. 2, for example.

Subsequently, an embodiment for generating a three-dimensional representation of at least one part of an object is described in more detail based on FIG. 7, as is exemplarily performed by the system described based on FIG. 2. In a first step S130, data is generated for the three-dimensional representation of the at least one part of the object, i.e. according to the above-described method, as was exemplarily described based on FIGS. 4, 5 and 6 or as was described based on the receiver side 202 in FIG. 2. Subsequently, in step S132, a transfer of the data is performed via the transfer medium 106 from the transmitter side 202 to the receiver side 204 (see FIG. 2), and the 3D recordings 100a and 100b shown in FIG. 2 are generated by, e.g., the 3D engine 210 on the receiver side 204 in step S134. As shown in FIG. 7 in step S136, the generation of the 3D recording is carried out by a 3D engine in order to stereoscopically represent or project the object. According to an embodiment (see step S138), the 3D recording is displayed by a display device, e.g. an autostereoscopic 3D monitor 108 or a battery of high intensity projectors.

Before the transfer in step S132, the data generated in step S130 may, according to an embodiment, be appropriately reduced by means of a quantization, however, accepting a loss of data. According to another embodiment, it may further be provided for a region-of-interest encoding to be applied already to the amount of data provided by step S130, and a differential encoding of individual successive frames/single images is also conceivable.

Furthermore, the amount of data may be binary-coded and further reduced, e.g. by run-length coding and similar state-of-the-art approaches.

The transfer in step S132 may be carried out by the internet or an intranet, e.g. by a client-server relationship using the TCP-IP protocol, the UDP protocol or the server-side protocol. Alternatively or additionally, the transfer S132 may also lead to locally storing the received individual images/frames as a local file.

In step S134, before providing the data to the 3D engine 210, unpacking the data according to its encoding and buffering the same be provided before the transfer, wherein buffering is provided to ensure that after reaching an initial desired filling level, a continuous processing of the data packets is possible, even with different or varying data rates with which the corresponding data packets are received at the receiver.

According to an embodiment, the step S138 may include displaying using the stereoscopic Pepper's ghost 3D method for generating holograms, as is illustrated in step S140, wherein an autostereoscopic 3D screen or a battery of high intensity projectors is provided in order to project appropriate 3D images, e.g. the images 100a, 100b generated by the 3D engine 210 (see FIG. 2), onto a glass pane including a lens grid and an appropriate 3D structure so that a 3D hologram is created for the human eye in a predetermined viewing direction in front of the glass pane.

According to further embodiments, e.g., it may be provided for a user to select on the receiver side a perspective from which the object is to be viewed, as is indicated in step S142, and according to step S144, the object is subsequently represented from the selected perspective based on the received data describing the 3D model of the object without the need of a feedback channel to the spot at which the 3D recording of the object is generated. This is a particularly embodiment since, at the receiver side, a 3D model of the object or of a part of the object is generated, which is transferred in the above-described manner to the receiver side with a reduced amount of data, and enables the recovery of the original 3D model on the receiver side using a corresponding 3D engine so that the entire 3D representation of the object is present at the receiver side. For example, if the entire object has been captured and processed as a 3D model, there is the possibility on the receiver side that a user freely selects a perspective with which he/she wants to view the corresponding object, and, according to the selected perspective, the 3D recordings needed for the corresponding representation are generated from the 3D model at the receiver side. Thus, on the receiver side, one may freely select from which perspective, or which angles of view, a 3D model is to be viewed so that the corresponding 3D recordings for representation on the receiver side screen may be generated without the need of a new recording and therefore without the need of a new transfer of the data or without the need of a feedback channel to the transmitter. This implementation is used in the following applications:

- presentations with glass panes in human size or larger at trade fairs or shows;
- communication application in the desk, e.g. in the form a screen-sized glass pane that may be pulled out of the desk, on which a hologram of the face of a conversation partner appears;
- in the living area, wherein a glass pane having projection hardware of any size is set up, or outer windowpanes, so that one or more conversation partners in the living area may be displayed standing as a hologram.

According to embodiments, this approach, as described in detail above based on the different embodiments, is used in the following applications:

- interactive and immersive 3D film for film content of any kind;
- communication in multi-user 3D worlds, e.g. for e-learning, edutainment, sales, politics, entertainment, shows;
- more realistic avatars for games and entertainment;
- virtual greeters as human representations for the local communication with people;
- virtual mirrors showing different clothes on people;
- monitoring machines in production plants within the framework of industry 4.0 and the Internet of Things, and logistics, operation and procurement of wearing parts;
- surveillance of people in critical infrastructures, e.g. border surveillance;
- training and simulation of dangerous or non-existing environments with human interactions.

In addition, the present embodiments are used in monitoring as representation and transfer of changing contents. For some applications, monitoring, detection and transfer of changing contents is particularly important. Here, differences of a static 3D model are generated within certain boundaries (threshold values) with respect to a recorded live image in order to detect changes more quickly and more accurately than in a 2D video image. An example is the monitoring of a drilling rig. A static 3D model of the drilling rig is compared multiple times per second to a 3D recording from an angle of view onto the drilling rig, wherein, e.g., the drilling rig may be animated at runtime via the 3D engine. Changes in the live 3D model such as a person entering the recording region are compared to the static 3D model and may trigger alarms. For a 3D view of the situation and the position of the rig with the person, only the transfer of the differences is needed since the static rig is already available as a 3D model, which, compared to the complete video transfer, is advantageous with respect to the amount of data, speed, 3D spatial view with an interactive visual focus and display quality as well as the quality of the visualization.

Subsequently, further embodiments are described, or already-described embodiments are put in concrete terms. For example, embodiments provide a method for generating data for a two- or three-dimensional representation of at least one part of an object, comprising:

generating a 3D model of the part of the object using a 3D recording of the part of the object; and providing data, using the 3D model, which describes the vertices of the part of the object in the three-dimensional space and the color values assigned to the vertices.

The approach for generating data for a two- or three-dimensional representation is advantageous since, unlike conventional approaches, the time consuming transfer of two-dimensional image data is omitted. Rather, proceeding from the three-dimensional image data representing a 3D recording of the part of the object, a 3D model is created which represents at least the part of the object from which the 3D recording has been obtained. For example, this 3D model may be a grid model or a triangle mesh, as is known from the field of CAD technology, for example. The model obtained in this way may be described by the position of the vertices in the three-dimensional space, for example, in the Cartesian coordinate system by the X, Y and Z values of the vertices. Furthermore, the color values may also be assigned to the corresponding vertices and, if applicable, texture information is also transferred. The amount of data generated by this is many times smaller than the amount of data generated when a 2D image with a size of 1024×768 pixels is transmitted, so that a fast and delay-free transfer of the data via a transfer medium is possible due to the low amount of data for representing the object in the three-dimensional shape, in particular, the problems in connection with the large amounts of data conventionally arising in the state of the art are avoided. The data generated in this way may either be used for generating a three-dimensional representation (e.g. a 3D live sequence or a 3D film) or for generating a two-dimensional representation (e.g. a 2D live sequence or a 2D film) on an appropriate display device for representing the object or the part of the object.

According to embodiments, the 3D recording includes the part of the object and a background, wherein the method further includes extracting the background from the data using the Z value of each vertex, e.g. by removing a vertex from the data if the Z value of the vertex is outside of a predefined range. According to embodiments, it may additionally be provided to correct the edge area of the object by filtering out depth distances exceeding a predetermined threshold value.

This approach is advantageous as it allows to represent the recorded object in a simple manner without the background that is also recorded, and to only generate the data for the actual object and not the background data that may perhaps not be needed, so that a further reduction of the amount of data is achieved by this. Furthermore, this approach makes it possible to represent the object that is to be three-dimensionally represented by the generated data in a different context at the receiver side, e.g. in front of another background.

According to embodiments, the 3D model is generated using at least one first 3D recording and one second 3D recording of the object from respectively different positions, wherein the first and second 3D recordings at least partially overlap. The different positions may be selected such that a region of the object that may not be seen in the first 3D recording of the object may be seen in the second 3D recording of the object. According to embodiments, it may be provided for a first 3D model to be generated using the first 3D recording and a second 3D model using the second 3D recording, and to connect the first and second 3D models into a common 3D model, wherein the data is provided using the common 3D model. According to embodiments, connecting the first and second 3D models into a common 3D model may include: arranging the first and second 3D models such that their overlapping regions are flush, identifying the vertices from the first 3D model and from the second 3D model that are within a predefined distance in a plane, and combining the identified vertices to a new vertex in the common 3D model. Advantageously, identifying and combining is repeated for a plurality of planes, wherein the number and the distance of the plurality of planes is selected such that the part of the object is represented by the common 3D model.

According to embodiments, it may be provided for a plurality of 3D recordings of the object from different at least partially overlapping positions to be used in order to generate the 3D models so that the 3D model includes several portions of the object or even the entire object.

This implementation is advantageous as it ensures that all regions of the part of the object to be represented three-dimensionally are described by corresponding data of the 3D model so that regions of the object that are not shown in the representation are detected and combined due to the second representation from another perspective, or from another angle of view. Particularly for the case of a plurality of recordings from a plurality of viewing directions, this enables the generation of a 3D model of the overall object, which is then described according to the vertices and the color values of the 3D model so that, when recovering the recordings in a simple manner on the receiver side, it is possible to view the object from any definable perspective, particularly viewing without erroneous or missing spots.

According to embodiments, providing the data includes reducing the amount of data without loss of data by determining the spatial distances of the vertices, and correcting the spatial distances as sequenced differences proceeding from a specified starting point. According to embodiments, it may be provided for encoding to be started at a lower point of the object and to spirally continue to an upper point of the object.

This approach is advantageous as it allows a further reduction of the amount of data without data loss, since, proceeding from the starting point that is completely encoded, only the difference values to the positions of the neighboring vertices are to be defined, which results in the mentioned further reduction of the amount of data.

According to embodiments, generating the 3D model includes providing the 3D recording of the object, or the part of the object, by a 3D camera, or providing a stereoscopic recording of the object, or the part of the object.

This implementation is advantageous since known approaches may be used for generating 3D recordings, or stereoscopic recordings, that are then used as an input to the process that is performed, e.g., by a 3D engine in order to detect the 3D model and to encode the same correspondingly.

According to embodiments, the object is a person, an animal, an item or a background.

This approach is advantageous since the approach is not subject to any restrictions with regard to the object to be represented since a significantly reduced data set may be obtained from the 3D recordings of the object in the described manner to describe it in a three-dimensional form. If the object is a background, this is advantageous since it gives the possibility to provide a desired background and to provide it to a remote position for representation in a three-dimensional design, in particular, the representation of the entire background, e.g., a space recorded by several cameras in a three-dimensional manner, allows for the generation of data for the representation of the background on the basis of the 3D model, which is transferred with a reduced amount of data and which makes it possible at the receiver side to generate the background, e.g. the space, such that a viewer at the receiving location may perceive the background from any position/perspective.

According to embodiments, generating the 3D model and providing the data is repeated with a predetermined refresh rate in order to generate a multitude of temporally successive frames that each contain the provided data and may be displayed as a 3D sequence. Advantageously, the refresh rate is selected such that up to 30 frames are generated in a second.

This approach is advantageous since it gives the possibility to generate 3D sequences or 3D films that, due to the low amount of data of each single frame, may be transferred without problems with respect to transfer duration, transfer bandwidth and amount of data from the location at which the data is generated to a receiving location at which the data is to be displayed. This approach makes it possible for the first time as compared to the state of the art to reliantly and quickly generate data for representing a 3D film, or a 3D sequence, that is suitable for a transfer via a transfer medium having a limited bandwidth, e.g., the internet.

According to embodiments, the object is at least the face of a person and the present method includes the following for each frame: providing a static facial model of an original face of another person, determining a position of the face of the person in the space when generating the 3D recording, superimposing the 3D model of the face of the person with the static facial model of the other person, adapting the 3D model of the face of the person with respect to the static facial model of the other person at the spots at which there is no movement, creating a texture from the 3D recording of the face of the person that is transparent at the spots at which there is a movement in order to generate a shadow mask texture, and semi-transparently texturing the shadow mask texture onto the adapted 3D model of the face of the person so that a resulting 3D sequence shows for the human eye a moving and animated representation of the original face.

This approach is advantageous as it enables in a simple way to assign to one person who is similar in physique and stature to a known person the facial contours of the other person, so that the provided data, which comprises a low amount of data due to the described approach, may be processed at the receiving location such that the viewer has the impression that the other person is represented, which is particularly advantageous in the entertainment industry and similar areas.

Embodiments further provide a method for generating a two- or three-dimensional representation of at least one part of an object, comprising:
  generating data for the two- or three-dimensional representation of the at least one part of the object according to the method described;
  transferring the data; and
  generating a 2D or 3D recording of the part of the object using the transferred data.

This approach is advantageous as, due to the described approach, the data generated for the three-dimensional representation only contains a small amount of data and is therefore transferred in a simple way. The data received in this way, which displays the 3D model, makes it possible, by applying a 3D engine, to generate a corresponding 3D recording of the part of the object, which may then be conventionally used for the three-dimensional representation on a display device, e.g., a stereoscopic screen. For example, this may be carried out by generating a 3D recording by means of the 3D engine in order to stereoscopically represent or project the object. Advantageously, the 3D engine generates up to 30 3D recordings per second, which is advantageous since moving images, i.e., 3D films or 3D sequences, may be generated from the received data.

According to embodiments, the method includes displaying the 3D recording by means of a display device, e.g. an autostereoscopic 3D screen or a battery of high-intensity projectors, wherein it may be provided for the display device to be operated using the stereoscopic Pepper's ghost 3D method for generating holograms. In this implementation, the method may include projecting the 3D recordings generated by the 3D engine onto a glass pane including a lens grid or an appropriate 3D structure so that a 3D hologram is created for the human eye within a region in front of the glass pane.

This approach is advantageous as it gives the possibility to use conventional display devices for generating 3D representations of objects, which are operated on the basis of input data, as used in the conventional technology, however, which is generated based on data generated from the 3D model.

According to embodiments, transferring the data may include a transfer via the internet or an intranet, e.g., by a client-server relationship, e.g., using TCP-IP, UDP, or the server-side protocols. Alternatively or additionally, locally storing the data as a file may also be provided.

This approach is advantageous since conventional transfer mediums may be used as, due to the described approach, there are no special requirements with respect to the provided bandwidth and transfer capacity.

According to embodiments, it may be provided for a perspective from which the object is to be viewed to be selected at the receiver side, and to represent the object from the viewed perspective based on the received data, wherein the data describes the 3D model of the object so that no feedback channel is needed to the location where the 3D recording of the object is generated.

This procedure represents a special advantage of the described approach since a 3D model of the object or of a part of the object is generated at the receiver side, which is transferred with a reduced amount of data to the receiver side in the manner described above. This enables the recovery of the original 3D model at the receiver side based on a corresponding 3D engine so that the entire 3D representation of the object is available at the receiver side. If the entire object was captured and processed as a 3D model, this gives the possibility at the receiver side, e.g., for a user to select a perspective with which he/she wants to look at the corresponding object and, according to the selected perspective, the 3D images needed for the corresponding representation are generated from the 3D model on the receiver side. Such a procedure is not easily possible in the conventional technology, since just the images generated on the transmitter side are available on the receiver side, which are to be combined for a three-dimensional representation on the display. In order to obtain another perspective, one needs to generate on the transmitter side a corresponding different recording from another perspective, to transfer the same and to then accordingly enable a representation. On the one hand, this involves a further transfer of the data with the above-described problems due to the high amount of data and, on the other hand, a feedback channel from the receiver side to the transmitter side would be needed in order to transfer the changed perspective to the transmitter in order to enable the desired further recording. This problem is avoided since the 3D model of the object, or the part of the object, is already present on the receiver side so that, on the receiver side, it may be determined from which perspective this 3D model is to be viewed so that the corresponding 3D recordings for the representation on the receiver-side monitor may be generated without the need for a further recording and therefore without the need for a further transfer of the data or without the need for a feedback channel to the transmitter.

Embodiments further provide a computer program having instructions for performing the method, if the instructions are executed by a computer, which also achieves the above-mentioned benefits in a computer implementation of the described approach.

Embodiments further provide an apparatus for generating data for a two- or three-dimensional representation of at least one part of an object, comprising:
    an input configured to receive a 3D recording of the part of the object;
    a 3D engine connected to the input and configured to, using the received 3D recording, generate a 3D model of the part of the object and, using the 3D model, to generate data describing the vertices of the part of the object in a three-dimensional space and the color values assigned to the vertices; and
    an output connected to the 3D engine and configured to provide the generated data.

According to embodiments, the 3D engine is configured to extract a background in the 3D recording from the data using the Z value of each vertex, wherein an edge region of the part of the object is advantageously corrected by filtering out depth distances exceeding a predefined threshold value.

According to embodiments, the input is configured to receive at least one first 3D recording and one second 3D recording of the object from respectively different positions, wherein the first and second 3D recordings at least partially overlap. The 3D engine is configured to generate the 3D model using the first 3D recording and the second 3D recording of the object. Advantageously, the 3D engine generates a first 3D model using the first 3D recording and a second 3D model using the second 3D recording and a common 3D model using the first and the second 3D models, wherein the data is generated using the common 3D model.

According to embodiments, the 3D engine causes a reduction of the amount of data without data loss by determining the spatial distances of the vertices and by spirally coding the spatial distances as sequenced differences proceeding from a specified starting point up to an end point.

According to embodiments, the apparatus includes a 3D camera or a stereoscopic recording apparatus for generating the 3D recording of the object, wherein the 3D camera, or the stereoscopic capturing apparatus, is connected to the input.

According to embodiments, the 3D engine is configured to generate the 3D model and the data with a determined refresh rate in order to generate a multitude of temporally successive frames that each contain the provided data and may be displayed as a 3D sequence.

According to embodiments, the object is at least the face of a person, and the 3D engine is configured to determine for each frame a position of the face of the person in the space when generating the 3D recording in order to superimpose the 3D model of the face of the person with a static facial model of an original face of another person to adapt the 3D model of the face of the person with respect to the static facial model of the other person at the spots at which there is no movement, to create a texture from the 3D recording of the face of the person that is transparent at the spots at which there is a movement, in order to generate a shadow mask texture, and to semi-transparently texture the shadow mask texture onto the adapted 3D model of the face of the person so that a resulting 3D sequence shows for the human eye a moving and animated representation of the original face.

The above described embodiments provide the advantages that have been described in connection with the described method.

Embodiments provide a system for generating a two- or three-dimensional representation of at least one part of an object, comprising:
    an apparatus for generating data for the two- or three-dimensional representation of the at least one part of the object according to embodiments,
    a transfer medium for transferring the data generated with the apparatus for generating data, and
    a 3D engine connected to the transfer medium and configured to generate a 2D or 3D recording of the part of the object using the transfer data.

According to embodiments, the system includes a display device, e.g., in the form of an autostereoscopic 3D screen or in the form of a battery of high-intensity projectors connected to the 3D engine. Advantageously, the display device is operated using the stereoscopic Pepper's ghost 3D method for generating holograms, and is configured to project the 3D recordings generated by the 3D engine onto a glass pane including a lens grid or an appropriate 3D structure, such that a 3D hologram is created for the human eye within a region in front of the glass pane.

According to embodiments, the 3D engine of the system is configured to receive a selection of a perspective from which the object is to be viewed, and to represent the object from the selected perspective based on the received data describing the 3D model so that no feedback channel is needed to the location at which the 3D recording of the object is generated.

The described system has the advantages described above in connection with the method.

Embodiments therefore provide the possibility for interactive real time 3D graphics. The problem present in the conventional technology with respect to the enormous amount of data concerning the representation of 3D objects is approached with the help of a 3D engine which runs, e.g., a so-called real time software for the representation of computer graphics. When encoding the 3D image data, the spatial component of the 3D model is used as a deterministic sequence of spatial distances so that the amount of data is significantly reduced while keeping the quality the same. The resulting data volume as a sequence of spatial distances is smaller by orders of magnitude than the data volume for the transfer of 3D image data as a sequence of 2D images. In addition, the spatial encoding of distance values may be performed more quickly than the compression of 2D image data, which makes it possible to perform a live transfer of 3D image data in real time that may be represented with an appropriate 3D engine at the receiver in three dimensions with the interactive change of visual focus or as a stereoscopic film in multiple 2D images per frame.

Embodiments were described in connection with the 3D representation of an object or of a part of the object.

According to further embodiments, the described approach may also be used for the two-dimensional representation of the object or of the part of the object, e.g. by processing and displaying the generated data that reproduces the 3D model on the receiver side as 2D images or as a 2D image sequence. In this case, the above-mentioned advantages over a conventional transmission of 2D images also arise.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable. Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer. The data carrier, the digital storage medium, or the recorded medium are typically tangible, or non-volatile. A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for representing a spatial image of an object in a virtual environment, the apparatus comprising:
a first image capturing element configured to generate a first stereoscopic image data stream of an environment;
a second image capturing element configured to generate a second stereoscopic image data stream of the object;
a computing unit configured to receive the first and the second stereoscopic image data streams, proceeding from a reference point, to generate a spatial image of the virtual environment based on the first stereoscopic image data stream and, proceeding from the reference point, to insert a spatial image of the object from the second stereoscopic image data stream into the virtual environment; wherein the spatial images are generated based on disparities that are tuned to a person standing on the reference point and having a specific viewing direction; and
a display element configured to, proceeding from the reference point, display the spatial image of the object in the virtual environment,
wherein the first image capturing element is configured to generate the first stereoscopic image data stream in an initialization phase; and
wherein the computing unit is configured to receive the first stereoscopic data stream, to store the same in a memory, and, in an operating mode, to generate depending on the reference point a spatial image of the environment from the stored first stereoscopic data stream.

2. The apparatus according to claim 1, comprising a third image capturing element configured to generate a third stereoscopic image data stream of a further object;
wherein the computing unit is configured to receive the third stereoscopic image data stream and to determine an orientation of the further object in the third stereoscopic image data stream and to adjust, proceeding from the reference point, disparities of the spatial image of the virtual environment and disparities of the spatial image of the object based on the orientation of the further object;
wherein the display element is configured to, taking into consideration the determined disparities of the spatial image and of the virtual environment, display the spatial image of the object in the virtual environment.

3. The apparatus according to claim 2,
wherein the computing unit is configured to insert a spatial image of the further object from the third stereoscopic image data stream into the virtual environment, and to adjust disparities of the spatial image of the further object based on an orientation of the object; and a further display element configured to, taking into consideration the disparities of the spatial image and the virtual environment, display the spatial image of the further object in the virtual environment so that a viewer of the further display element is given the impression of a 3D object in a 3D environment.

4. The apparatus according to claim 1, wherein the computing unit is configured to, upon a change of the reference point, re-generate the spatial image of the virtual environment and the spatial image of the object based on the changed reference point.

5. The apparatus according to claim 1,
wherein the second image capturing element is configured to generate the second stereoscopic image data stream of the object at a further point in time;
wherein the computing unit is configured to receive the second stereoscopic image data stream at a further point in time, to determine a position and/or an orientation of the object at the further point in time proceeding from a reference point, and to adapt the spatial image of the object in the virtual environment based on the position and/or the orientation of the object at the further point in time.

6. The apparatus according to claim 1, wherein the computing unit is configured to superimpose at least one part of the spatial image of the object with superimposition image data.

7. The apparatus according to claim 6, wherein the computing unit is configured to determine a current appearance of the object and to adapt the superimposition image data based on the determined current appearance or to select superimposition image data from a plurality of superimposition image data based on the determined current appearance and to superimpose the selected superimposition image data onto the part of the spatial image.

8. The apparatus according to claim 6, wherein the image capturing element is configured to, in the initialization phase, scan an eye area or a face of a person as the object and to store it as superimposition image data, the computing unit being configured to, in the operating mode, superimpose data glasses worn by the person with the superimposition images acquired in the initialization phase.

9. The apparatus according to claim 8, wherein the computing unit is configured to adapt the eye area of the face in the superimposition image data based on a mood of the person and to superimpose the superimposition image data onto the person.

10. The apparatus according to claim 9, wherein the image unit is configured to create a plurality of superimposition image data, wherein the computing unit is configured to compare the mood based on a comparison of a current position of the corners of the mouth of the person with respect to a position of the corners of the mouth in the plurality of superimposition image data, and to select the superimposition image that best reflects the current facial expression.

11. The apparatus according to claim 1, wherein the first image capturing element is an image capturing element configured to record a spatial image of an object and/or a spatial image of an environment.

12. The apparatus according to claim 1, wherein the spatial image of the object and/or the spatial image of the environment comprises the absence of a grid model.

13. A method for presenting a spatial image of an object in a virtual environment, comprising:
generating a first stereoscopic image data stream of an environment; wherein the first stereoscopic image data stream is generated in an initialization phase, and the same is stored in a memory;
generating a second stereoscopic image data stream of the object;
receiving the first and the second stereoscopic image data streams;
generating a spatial image of the virtual environment, proceeding from a reference point, based on the first stereoscopic image data stream; wherein the spatial images are generated based on disparities that are tuned to a person standing on the reference point and having a specific viewing direction, and, in an operating mode, generating a spatial image of the environment depending on the reference point from the stored first stereoscopic data stream;
inserting the object, proceeding from the reference point, from the second stereoscopic image data stream into the virtual environment; and
displaying, proceeding from the reference point, the spatial image of the object in the virtual environment.

14. A non-transitory digital storage medium having a computer program stored thereon to perform the method for presenting a spatial image of an object in a virtual environment, comprising:
generating a first stereoscopic image data stream of an environment; wherein the first stereoscopic image data stream is generated in an initialization phase, and the same is stored in a memory;
generating a second stereoscopic image data stream of the object;
receiving the first and the second stereoscopic image data streams;
generating a spatial image of the virtual environment, proceeding from a reference point, based on the first stereoscopic image data stream; wherein the spatial images are generated based on disparities that are tuned to a person standing on the reference point and having a specific viewing direction, and, in an operating mode, generating a spatial image of the environment depending on the reference point from the stored first stereoscopic data stream;
inserting the object, proceeding from the reference point, from the second stereoscopic image data stream into the virtual environment; and
displaying, proceeding from the reference point, the spatial image of the object in the virtual environment,
when said computer program is run by a computer.

* * * * *